United States Patent
Zhou et al.

(10) Patent No.: US 11,283,526 B2
(45) Date of Patent: Mar. 22, 2022

(54) COHERENT RECEIVER WITH MIXED SIGNAL PROCESSING

(71) Applicant: Google LLC, Mountain View, CA (US)

(72) Inventors: Xiang Zhou, Sunnyvale, CA (US); Hong Liu, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/206,854

(22) Filed: Mar. 19, 2021

(65) Prior Publication Data
US 2021/0211203 A1     Jul. 8, 2021

Related U.S. Application Data

(62) Division of application No. 16/675,375, filed on Nov. 6, 2019, now Pat. No. 10,979,148.

(51) Int. Cl.
| | | |
|---|---|---|
| *H04B 10/61* | (2013.01) | |
| *H04B 10/54* | (2013.01) | |
| *H04B 10/556* | (2013.01) | |
| *H04B 10/2507* | (2013.01) | |
| *H04B 10/524* | (2013.01) | |
| *H04J 14/06* | (2006.01) | |

(52) U.S. Cl.
CPC ... *H04B 10/5561* (2013.01); *H04B 10/25073* (2013.01); *H04B 10/524* (2013.01); *H04B 10/541* (2013.01); *H04J 14/06* (2013.01)

(58) Field of Classification Search
CPC .............................. H04B 10/616; H04B 10/54
See application file for complete search history.

(56) References Cited

U.S. PATENT DOCUMENTS

| | | | |
|---|---|---|---|
| 8,188,418 B1 * | 5/2012 | Kondratko | G01S 7/4861 250/214 LS |
| 10,243,655 B2 | 3/2019 | Zhou | |
| 2010/0266291 A1 | 10/2010 | Boffi et al. | |
| 2012/0269514 A1 | 10/2012 | Nedovic | |
| 2013/0138375 A1 | 5/2013 | Zhou et al. | |

(Continued)

FOREIGN PATENT DOCUMENTS

WO     2018099573 A1     6/2018

OTHER PUBLICATIONS

Ahmed et al. "Effect of Four-Wave Mixing on the Transmission Performance of O-Band Multichannel PAM-Based Unamplified Datacenter Interconnects", International Journal of Networks and Communications, 2018 (Year: 2018).

(Continued)

*Primary Examiner* — Shi K Li
(74) *Attorney, Agent, or Firm* — Lerner, David, Littenberg, Krumholz & Mentlik, LLP

(57) ABSTRACT

A receiver system is provided for receiving a coherent Pulse Amplitude Modulation (PAM) encoded signal. The receiver system may include an optical polarization component configured to modulate a polarization of the received coherent PAM encoded signal. The receiver system may further include a digital signal processor (DSP) configured to perform polarization recovery between the received coherent PAM encoded signal and the LO signal using a first control loop, and to perform phase recovery between the received coherent PAM encoded signal and the LO signal using a second control loop.

15 Claims, 15 Drawing Sheets

(56) References Cited

U.S. PATENT DOCUMENTS

| 2016/0182219 | A1* | 6/2016 | Taylor ................. H04L 7/0075 |
| | | | 398/115 |
| 2018/0183520 | A1* | 6/2018 | Zhou ................. H04B 10/2575 |
| 2018/0316541 | A1 | 11/2018 | Liu et al. |
| 2019/0207702 | A1 | 7/2019 | van Veen et al. |
| 2020/0195354 | A1 | 6/2020 | Perin et al. |

OTHER PUBLICATIONS

Infinera. "The Next Generation of Coherent Optical" Advanced Coherent Toolkit for Super-channels. © 2016 Infinera Corporation. 8 pages.

Kamran, Rashmi and Shalabh Gupta. "High-Capacity Coherent DCIs using PolMuxed Carrier and LO-Less Receiver" Jul. 16, 2019. 7 pages.

Morsy-Osman, Mohamed et al. "DSP-free 'coherent-lite' transceiver for next generation single wavelength optical intra-datacenter interconnects." Apr. 2, 2018. Optics Express 8890, vol. 26, No. 7. 14 pages.

Perin, Jose Krause et al. "Design of Low-Power DSP-Free Coherent Receivers for Data Center Links." Nov. 1, 2017. Journal of Lightwave Technology, vol. 35, No. 21. pp. 4650-4662.

Pilori, Dario. "Advanced Digital Signal Processing Techniques for High-Speed Optical Communications Links." Apr. 26, 2019. Doctoral Dissertation. Politecnico di Torino. 153 pages.

Zhou et al "112 Gbit/s PDM-PAM4 Transmission Over 80-km SMF Using Digital Coherent Detection Without Optical Amplifier" 2016 10th International Symposium on Communications, Networks and Digital Signal Processing (CSNDSP), IEEE, 2016 (Year: 2016).

Tomkos et al. Low-Cost/Power Coherent Transceivers for Intra-Datacenter Interconnections and 5G Fronthaul Links. 2019 21st International Conference on Transparent Optical Networks (ICTON), IEEE, Jul. 9, 2019, pp. 1-5, DOI: 10.1109/ICTON.2019.8840195.

Chorchos et al. W-Band Real-Time Transmission Utilizing a Reconfigurable RAU for NG-PON Networks. 2016 Advances in Wireless and Optical Communications (RTUWO), IEEE, Nov. 3, 2016, pp. 66-69, DOI: 10.1109/RTUW0.2016.7821857.

Zhou et al. Beyond 1Tb/s Datacenter Interconnect Technology: Challenges and Solutions. 2019 Optical Fiber Communications Conference and Exhibition (OFC), OSA, Mar. 3, 2019, pp. 1-3.

Extended European Search Report for European Patent Application No. 20205904.4 dated Apr. 23, 2021. 12 pages.

* cited by examiner

COHERENT RECEIVER WITH MIXED SIGNAL PROCESSING

CROSS-REFERENCE TO RELATED APPLICATIONS

The present application is a divisional of U.S. patent application Ser. No. 16/675,375, filed on Nov. 6, 2019, the disclosure of which is incorporated herein by reference.

BACKGROUND

In an optical network, a transmitter system may modulate light signals to encode data, and a receiver system may detect and decode the modulated light signals to recover the data. An Intensity-Modulation/Direct-Detection (IM-DD) Pulse Amplitude Modulation (PAM) system modulates intensity of a carrier signal to encode data. In contrast, a coherent PAM system modulates amplitude of the optical field of a carrier signal to encode data. A coherent Quadrature Amplitude Modulation (QAM) system modulates the optical field of two carrier signals to encode data, such as either or both amplitude and/or phase of the two carrier signals.

In long-haul and metro networks, QAM systems are widely used. However, for low-power datacenter-reach optical interconnects, QAM technology has several challenges. First, QAM transceivers may not be compatible with IM-DD PAM transceivers, but interoperability is often required in datacenters, as datacenter networks are often upgraded block by block. Second, QAM systems may use more power than PAM systems since QAM transceivers may require higher bias voltage for modulation, and additional components such as additional Digital Signal Processing (DSP) functional blocks may be needed for polarization and phase recovery. Third, to perform phase modulation, QAM systems may have stricter requirements on the lasers and modulators used, such as speed, bandwidth, extinction ratio etc.

Existing polarization-diverse and phase-diverse receiver systems can receive and decode coherent encoded signals, such as coherent QAM or coherent PAM encoded signals. Since properties of a signal can change during transmission, the receiver system needs to perform recovery of these properties once the signal is received. For example, a received coherent PAM encoded signal may be split by a Polarizing Beam Splitter (PBS) into two beams with orthogonal polarizations, such as the transverse electric (TE) mode polarized light beam and the transverse magnetic (TM) mode polarized light beam. A 90° polarization rotator may be built into the PBS to convert the TM mode polarized light beam into the TE mode polarized such that the two outputs of the PBS are both TE-mode polarized light beams. For convenience, through this document, the principal polarization axes of the PBS are denoted as x-axis and y-axis. Further, the original TE-mode polarized signal is denoted as "x-polarized beam," while the TE-mode polarized signal converted from the original TM mode signal is denoted as "y-polarized beam."

Recovery of polarization and phase information is then performed on each of the polarized beams by reference to a signal from a Local Oscillator (LO) with known properties. In this regard, an Optical Coupler (OC) splits the LO signal into two beams, and interferences may then be performed between each polarized coherent PAM encoded beam and one of the two LO beams by two respective hybrids. For instance, an x-polarized 90° hybrid may perform interference between the x-polarized beam and a first LO beam, and a y-polarized 90° hybrid may perform interference between the y-polarized beam and a second LO beam. Since properties of the LO are known, the resultant wave from each interference may be analyzed to determine properties of each polarized coherent PAM encoded beam.

As a result of the interference, the two hybrids may output four signals—two phases for each of the two polarizations. These four signals are then respectively passed through four photodetectors (PD) that convert optical signals to electrical signals, and four transimpedance amplifiers (TIA) that amplify the electrical signals. In some examples, each of the four PDs may be a pair of balanced PDs configured to cancel common-node noises. The amplified electrical signals are then respectively passed through four analog to digital converters (ADC) and converted into digital signals. Once the four separated signals are converted from optical into electrical by the PDs/TIAs, and digitized by the ADCs, the Digital Signal Processor (DSP) may extract amplitude and phase information in the electrical domain to decode and recover the data.

Although a coherent PAM system may use a conventional polarization- and phase-diverse digital coherent receiver system, such a complex receiver system may be inefficient for recovering coherent PAM encoded signals. Further, the conventional polarization-diverse and phase-diverse receiver system is not compatible with an IM-DD PAM transmitter system.

SUMMARY

The present disclosure provides for receiver system comprising an optical polarization component and a digital signal processor (DSP). The optical polarization component may be configured to modulate a polarization of a received coherent Pulse Amplitude Modulation (PAM) encoded signal. The DSP may be configured to perform polarization recovery between the received coherent PAM encoded signal and a local oscillator (LO) signal using a first control loop; and to perform phase recovery between the received coherent PAM encoded signal and the LO signal using a second control loop.

The DSP may be configured to determine polarization adjustments to the received coherent PAM encoded signal in an electrical domain and the optical polarization component may be configured to apply the polarization adjustments to the received coherent PAM encoded signal in an optical domain. The DSP may be configured to determine the polarization adjustments by maximizing a beating signal power between the LO signal and a polarized portion of the received coherent PAM encoded signal with encoded data. The receiver system may further comprise a low-speed circuit configured to detect an average power of a polarized portion of the received coherent PAM encoded signal, wherein the DSP may be configured to determine the polarization adjustments by minimizing the average power of the polarized portion.

The optical polarization component may be an optical polarization controller for receiving a single polarization or dual polarization coherent PAM encoded signal, or an optical demultiplexer for receiving a dual-polarization coherent PAM encoded signal.

The receiver system may further comprise one or more optical phase modulators, wherein the DSP may be configured to determine phase adjustments to the LO in an electrical domain and the one or more optical phase modulators may be configured to apply the phase adjustments to the LO signal in an optical domain. The DSP may be configured to determine the phase adjustments based on known pilot data symbols inserted in the received coherent PAM encoded signal. The DSP may be configured to determine frequency adjustments to the LO signal in an electrical domain and the one or more optical phase modulators may be configured to apply the frequency adjustments to the LO signal in an optical domain.

The DSP may be configured to determine frequency adjustments to the LO in an electrical domain and the LO may be configured to apply the frequency adjustments to the LO signal in an optical domain.

The receiver system may further comprise a wavelength demultiplexer configured to receive coherent PAM encoded signal that includes a plurality of wavelengths.

The first control loop may be a polarization feedback control loop, and the second control loop may be a phase feedback control loop.

The first control loop and the second control loop may be part of a same control loop for joint polarization and phase recovery. The control loop for joint polarization and phase recovery may be configured to introduce a 45° polarization angle between the received signal and the LO. The receiver system may further comprise a joint polarization-diverse and phase-diverse coherent detection circuitry, wherein, the polarization-diverse coherent detection circuitry and the phase-diverse coherent detection circuitry may share one or more common circuit elements.

The receiver system may further comprise a two-mode switch, wherein, when the two-mode switch is set in a first mode, the two-mode switch may be configured as an optical coupler (OC) for receiving coherent PAM encoded signal, and when the two-mode switch is set in a second mode, the two-mode switch may be configured as a switch for receiving an intensity modulation direct-detect (IM-DD) PAM encoded signal.

The present disclosure further provides for a receiver system comprising a polarization beam splitter, two hybrids, an analog equalizer, and a DSP. The polarization beam splitter may be configured to split a received coherent PAM encoded signal into two polarized PAM encoded signals. The two hybrids may be configured to combine each of the two polarized PAM encoded signals with a LO signal. The analog equalizer may be configured to perform polarization recovery between the received coherent PAM encoded signal and the LO signal, and perform phase recovery between the received coherent PAM encoded signal and the LO signal. The DSP may be configured to provide equalizer coefficients to the analog equalizer for polarization and phase recovery. The analog equalizer may be a 4×2 multi-input multi-output equalizer.

The present disclosure still further provides for receiving, by a receiver system, a coherent PAM encoded signal; receiving, by the receiver system, a LO signal; performing, by the receiver system using mixed signal processing, polarization recovery between the received coherent PAM encoded signal and the LO signal using a first control loop; and performing, by the receiver system using mixed signal processing, phase recovery between the received coherent PAM encoded signal and the LO signal using a second control loop.

The mixed signal processing may include processing in an optical domain and processing in an electrical domain. The mixed signal processing may include processing in an analog domain and processing in a digital domain.

DETAILED DESCRIPTION

Overview

Figure 1A:
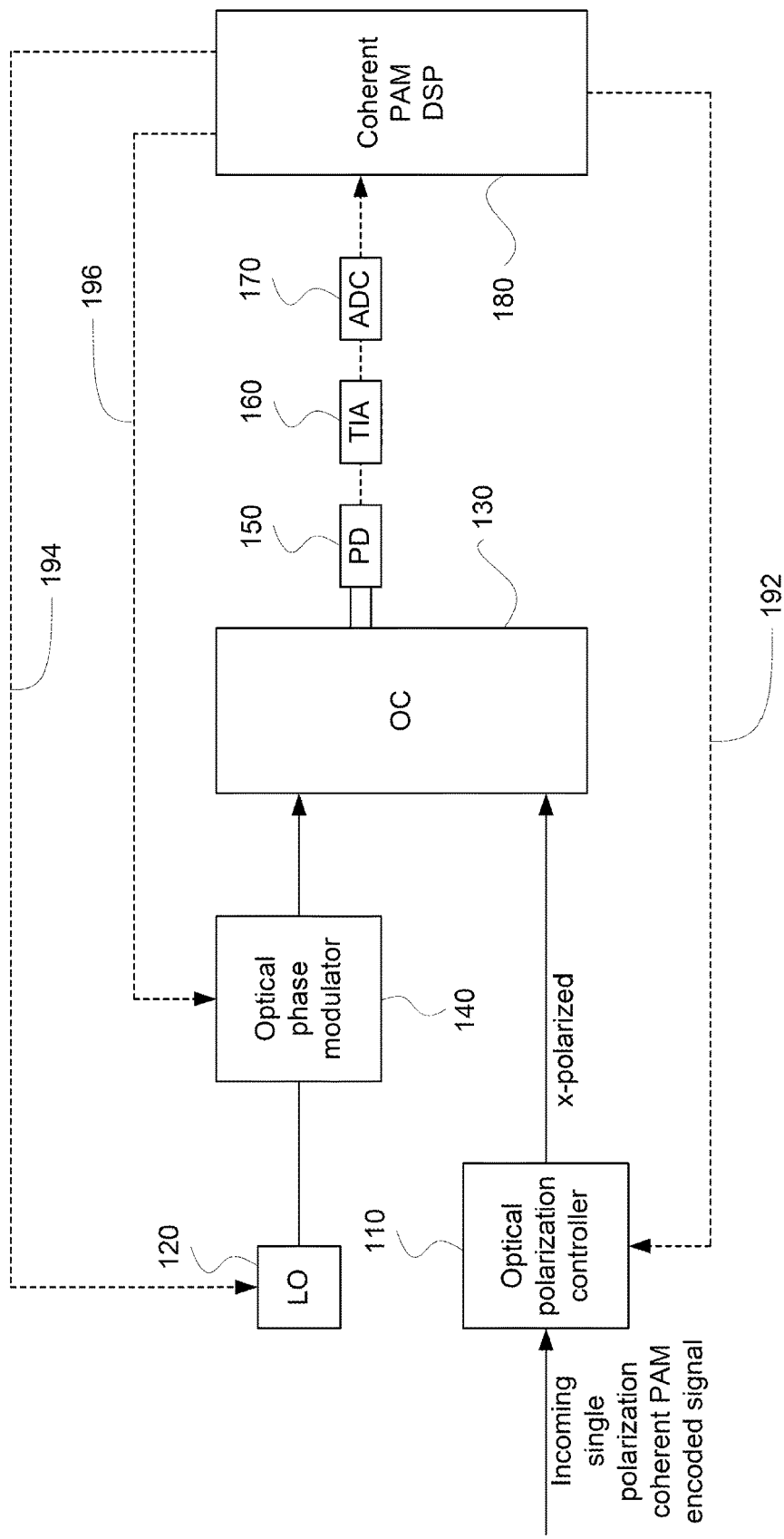
FIGS. 1A and 1B show example receiver systems with mixed electrical and optical signal processing for single polarization signals in accordance with aspects of the disclosure.

The technology relates generally to a coherent receiver system with mixed signal processing. A PAM system may be used for datacenter-reach optical interconnects. In terms of interoperability, a coherent PAM transmitter and an IM-DD PAM transmitter may both use the same type of modulators, such as Mach-Zehnder Modulators (MZM). A receiver system is provided with mixed signal processing. For instance, the receiver system may include an optical polarization component configured to modulate a polarization of the received coherent PAM encoded signal. The receiver system may further include a digital signal processor (DSP) configured to perform polarization recovery between the received coherent PAM encoded signal and the LO signal using a first control circuitry or loop, and to perform phase recovery between the received coherent PAM encoded signal and the LO signal using a second control circuitry or loop.

With respect to polarization recovery, polarization adjustments to be made may be determined by the DSP in the electrical domain, and the optical polarization controller may make these polarization adjustments to the received coherent PAM encoded signal in the optical domain. For example, the DSP may determine polarization adjustments in a feedback control loop by maximizing a beating signal power between the LO and a polarized portion of the coherent PAM encoded signal with encoded data. Alternatively, the DSP may determine polarization adjustments in a feedback control loop by minimizing power of a polarized portion without encoded data.

With respect to phase recovery, phase adjustments to be made may be determined by the DSP in the electrical domain, and one or more optical phase modulator may make these phase adjustments to the LO signal in the optical domain. For example, the DSP may determine phase adjustments in a feedback control loop based on known pilot data symbols inserted in the coherent PAM encoded signal.

In some instances, instead of independent polarization and phase recovery control loops or circuitry, polarization and phase recovery may be performed using a single control loop or circuitry through a joint polarization-diverse and phase-diverse coherent detection method. In this regard, the optical polarization component may be implemented using a 1×2 optical polarization controller. The 1×2 optical polarization controller may be configured to apply polarization adjustments to the coherent PAM encoded signal to introduce a 45° of polarization angle between the adjusted PAM encoded signal and the LO. Interference may be performed between the adjusted coherent PAM encoded signal and two phase-diverse LO signals. The DSP may then analyze the resulting beams and known pilot data symbols to determine adjustments for polarization and phase recovery.

The receiver system may be configured with additional and/or alternative features for receiving different types of PAM encoded signals. For instance, to receive a dual-polarization coherent PAM encoded signal, an optical polarization demultiplexer may be used as the optical polarization component to separate the two encoded polarizations. As another example, to receive a PAM encoded signal with multiple wavelengths, a wavelength demultiplexer may be provided to separate the multiple wavelengths into different beams for separate analysis.

Further, the receiver system may be configured to receive an intensity modulation direct-detect (IM-DD) PAM encoded signal as well as a coherent PAM encoded signal. In this regard, a two-mode switch may be provided such that, when the two-mode switch is set in a first mode, the two-mode switch is configured as an optical coupler (OC) for receiving a coherent PAM encoded signal. In contrast, when the two-mode switch is set in a second mode, the two-mode switch is configured as a switch for receiving an IM-DD PAM encoded signal.

Additionally or alternatively, a coherent receiver system may be configured with mixed analog and digital processing. For instance, the receiver system may include a polarization beam splitter (PBS) configured to split a PAM encoded signal into two polarized PAM encoded signals, and two hybrids configured to combine each of the two polarized PAM encoded signals with a local oscillator (LO) signal. The receiver system may further include an analog equalizer and a DSP configured to perform polarization and phase recovery between the received coherent PAM encoded signal and the LO signal.

In another aspect, a PAM transmission system may be provided with interoperability between coherent PAM and IM-DD PAM transmission. In this regard, the PAM transmission may include a transmitter system and a receiver system. When set in a first mode, the transmitter system may be configured to transmit coherent PAM encoded data, and the receiver system may be configured to receive the coherent PAM encoded data. When set in a second mode, the transmitter system may be configured to transmit IM-DD PAM encoded data, and the receiver system may be configured to receive the IM-DD PAM encoded data. In this regard, a two-mode switch may be provided in both the transmitter system and the receiver system to allow the change between the coherent PAM and IM-DD PAM modes.

The technology provides power efficient receiver systems in datacenters. The technology provides receiver systems that are compatible with both coherent PAM and IM-DD PAM transmission systems, which increases design flexibility of a datacenter. Further, by using mixed optical and electrical processing, and/or mixed electrical and digital processing, components with high power consumption may be reduced. Additionally, by using a PAM system that does not perform phase modulation, requirements on optical equipment, such as lasers, may be relaxed, which may further increase power efficiency and design flexibility.

Example Systems

Figure 2A:
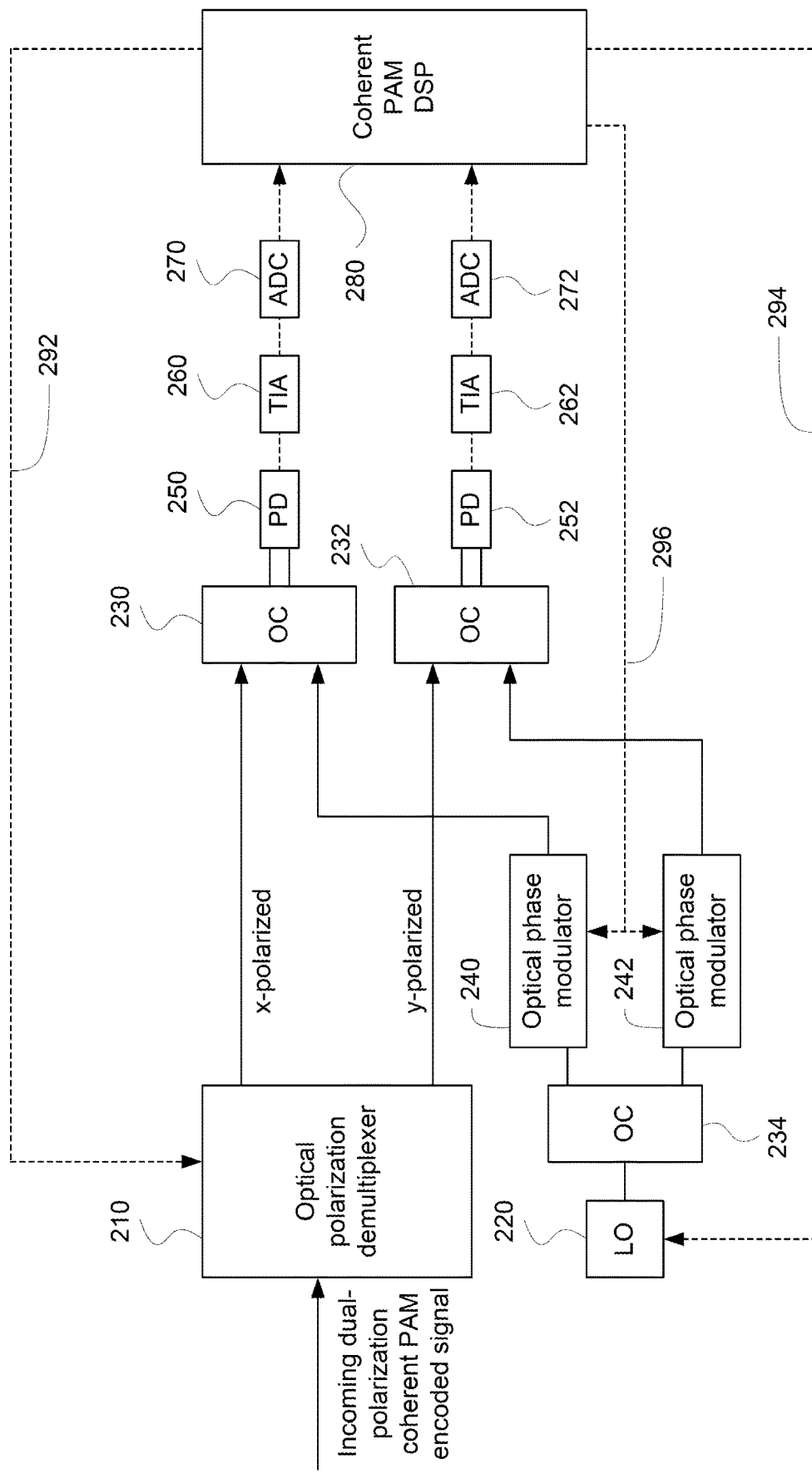
FIGS. 2A and 2B show example receiver systems with mixed electrical and optical signal processing for dual polarization signals in accordance with aspects of the disclosure.
Figure 2B:
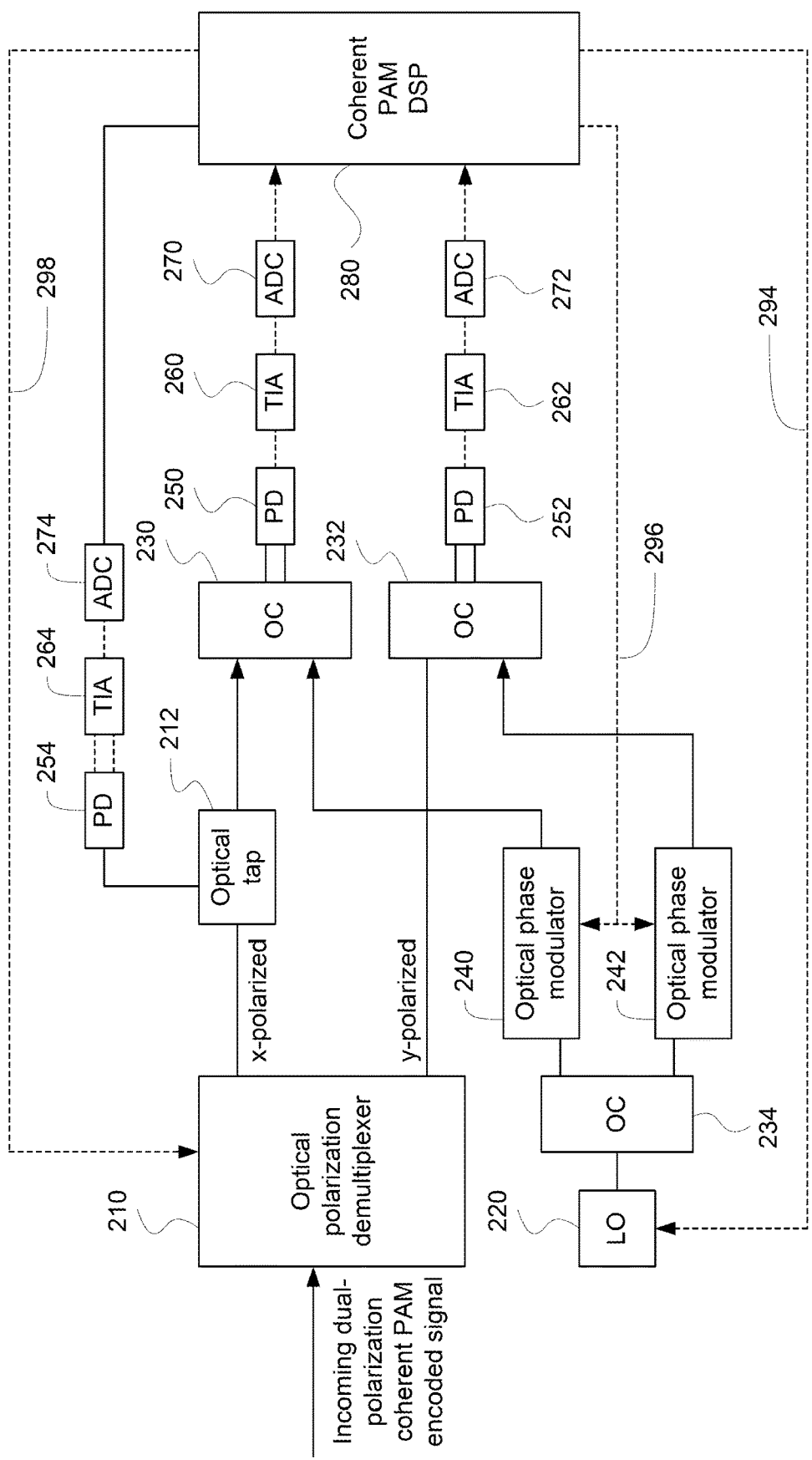
Figure 3A:
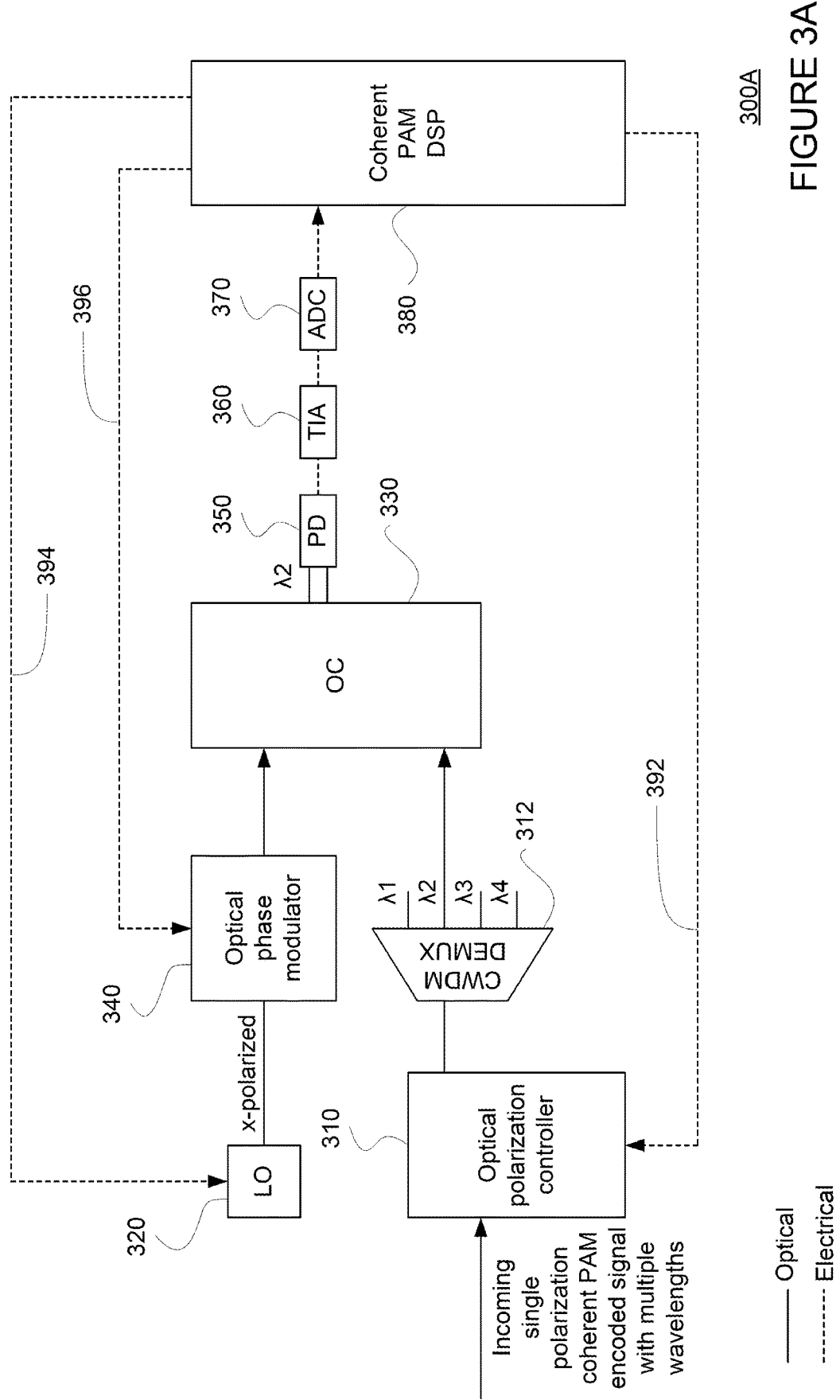
FIGS. 3A and 3B show example receiver systems with mixed electrical and optical signal processing for signals with multiple wavelengths in accordance with aspects of the disclosure.
Figure 3B:
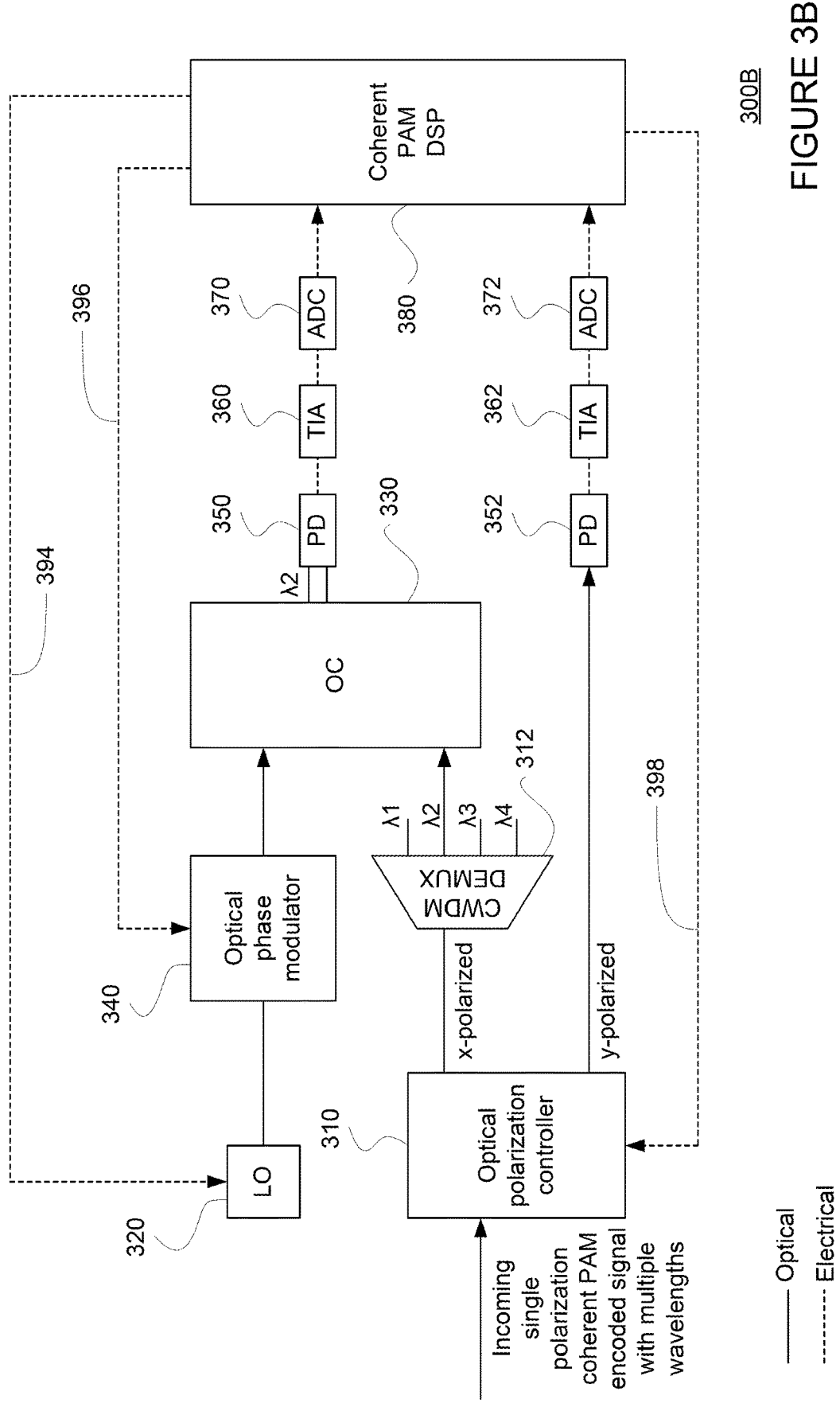
Figure 4A:
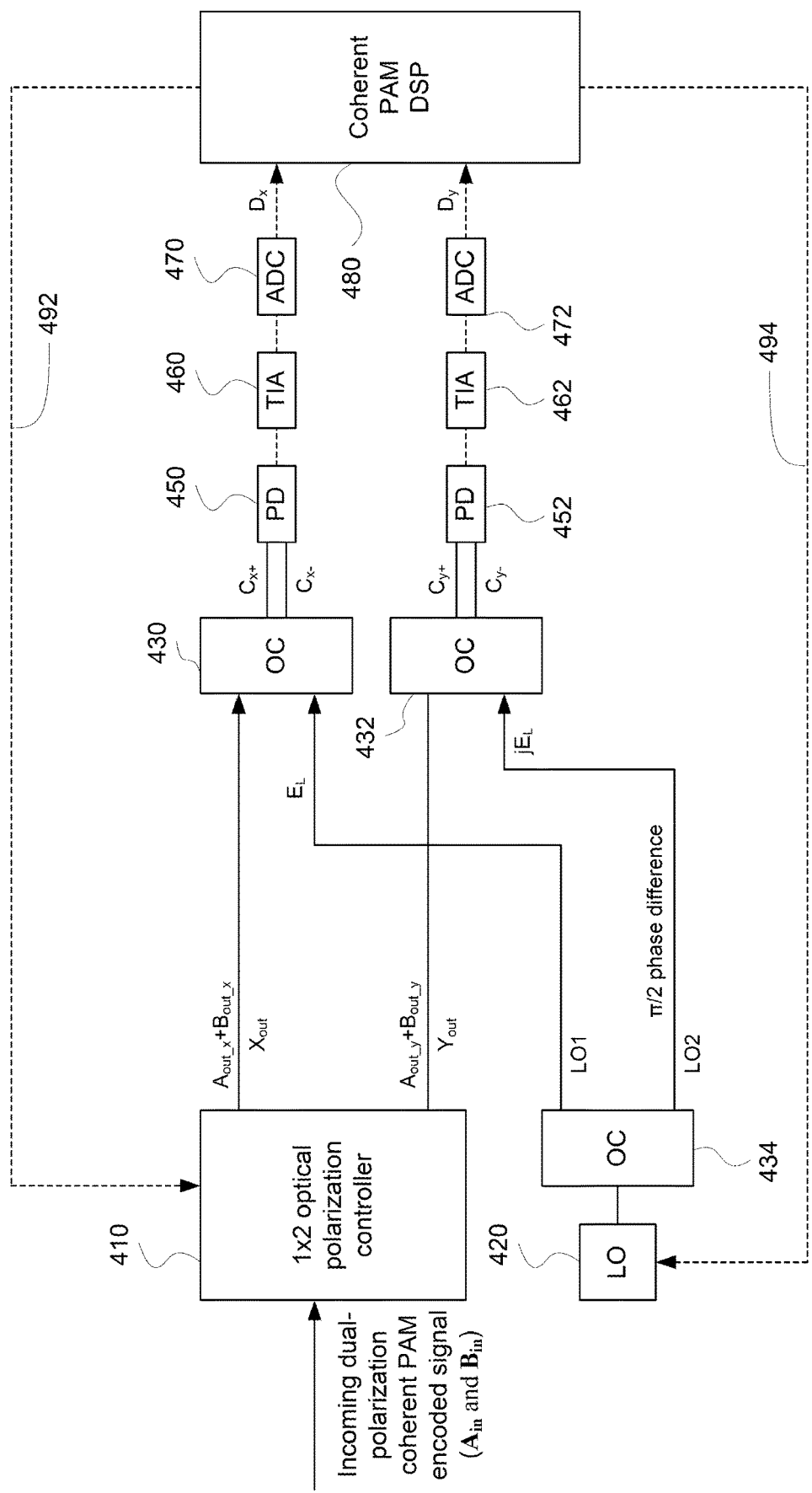
FIGS. 4A and 4B show example receiver system with mixed electrical and optical signal processing with joint polarization-diverse and phase-diverse coherent detection in accordance with aspects of the disclosure.
Figure 4B:
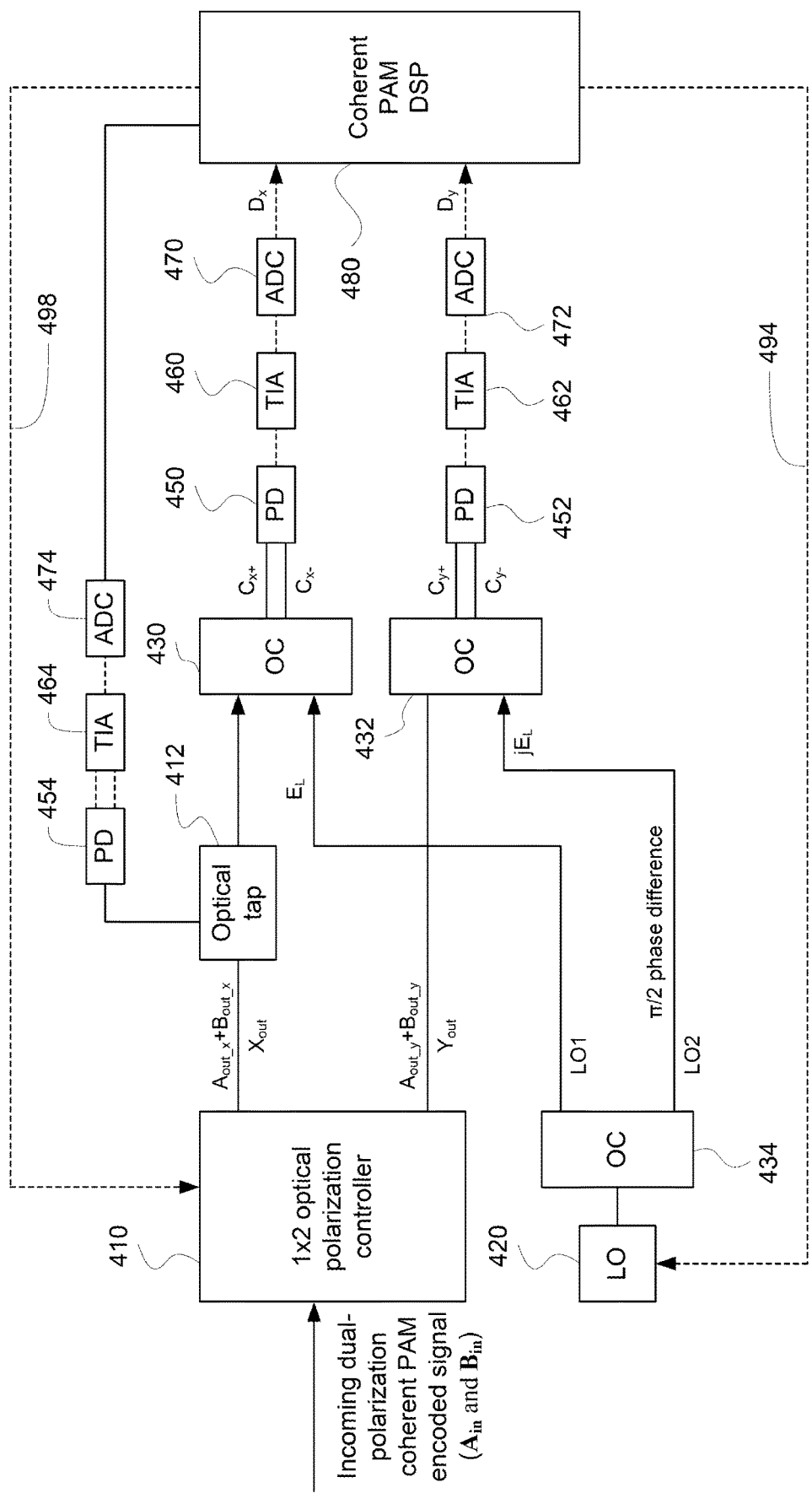
Figure 5A:
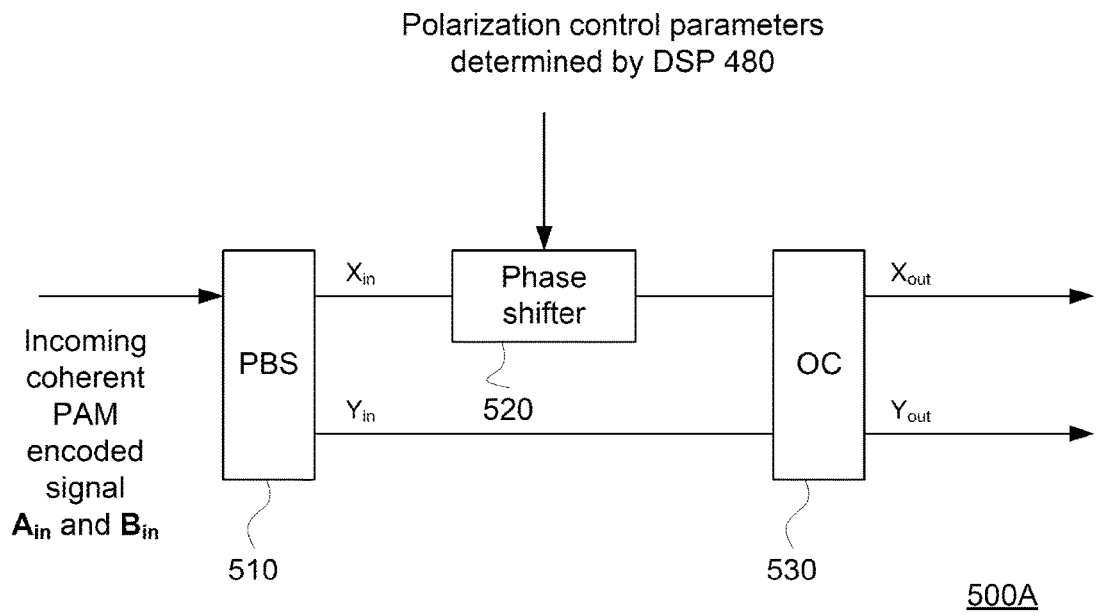
FIGS. 5A, 5B, and 5C show example 1×2 optical polarization controllers that can be used to enable joint polarization-diverse and phase-diverse coherent detection in accordance with aspects of the disclosure.
Figure 5B:
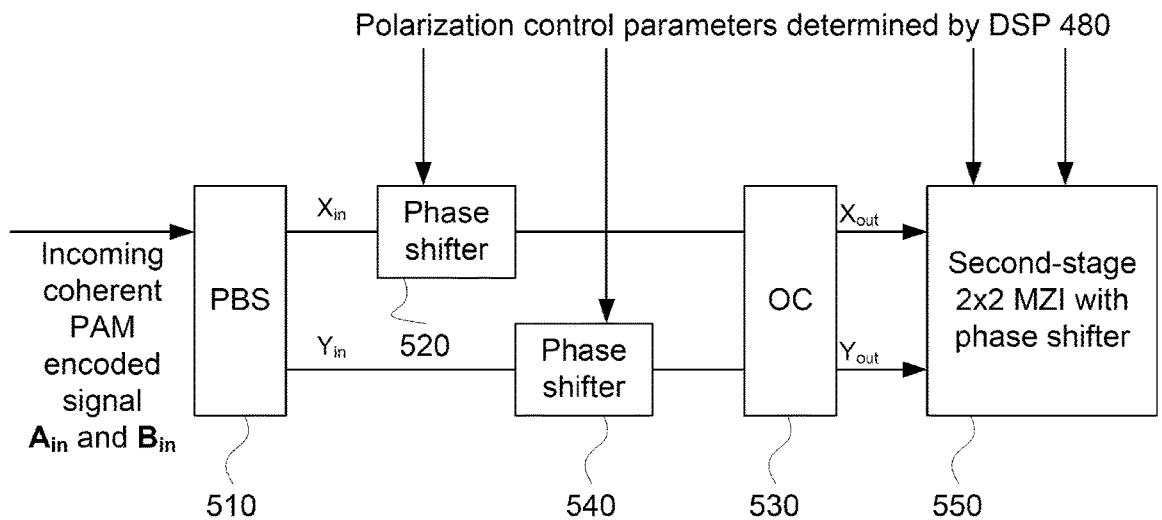
Figure 5C:
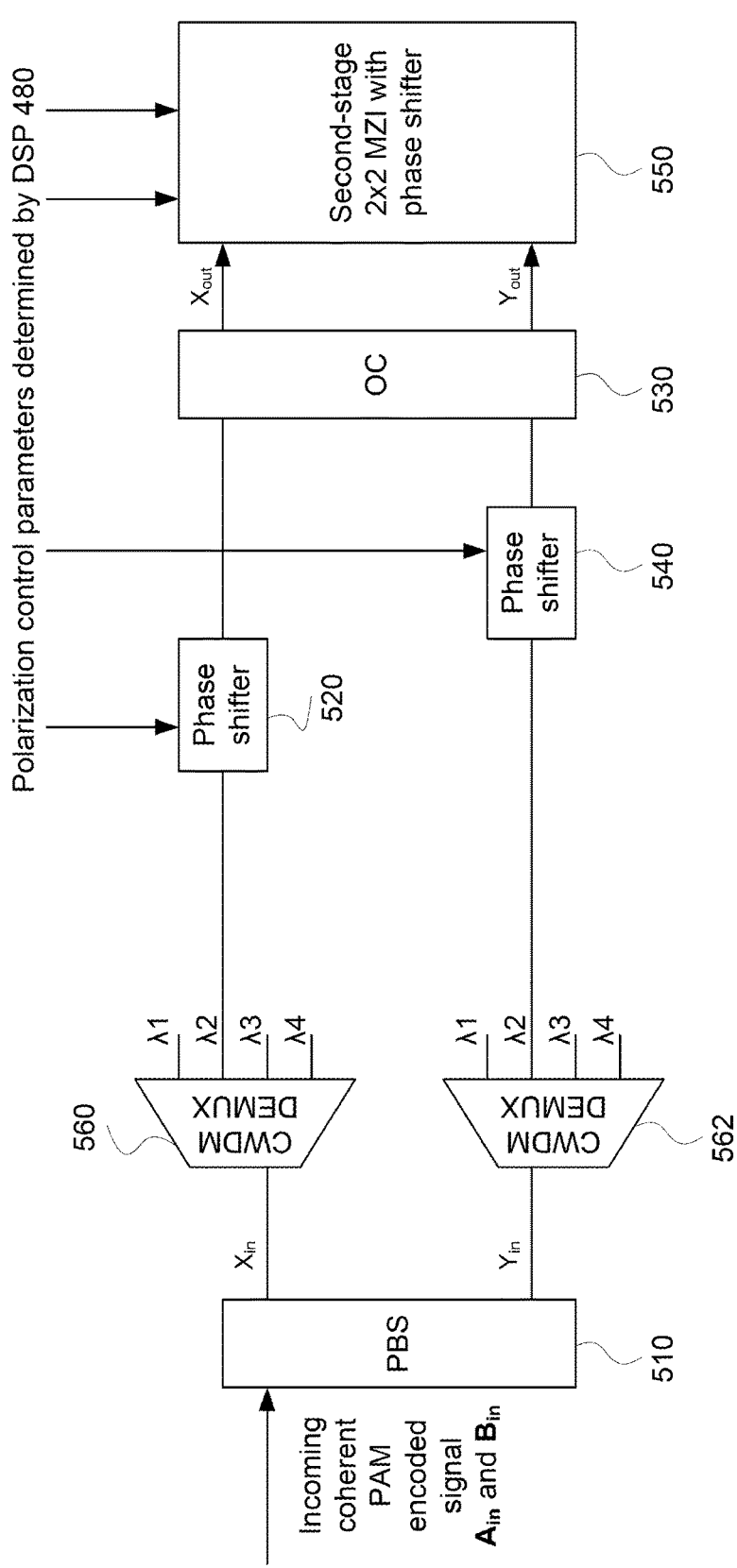
Figure 6:
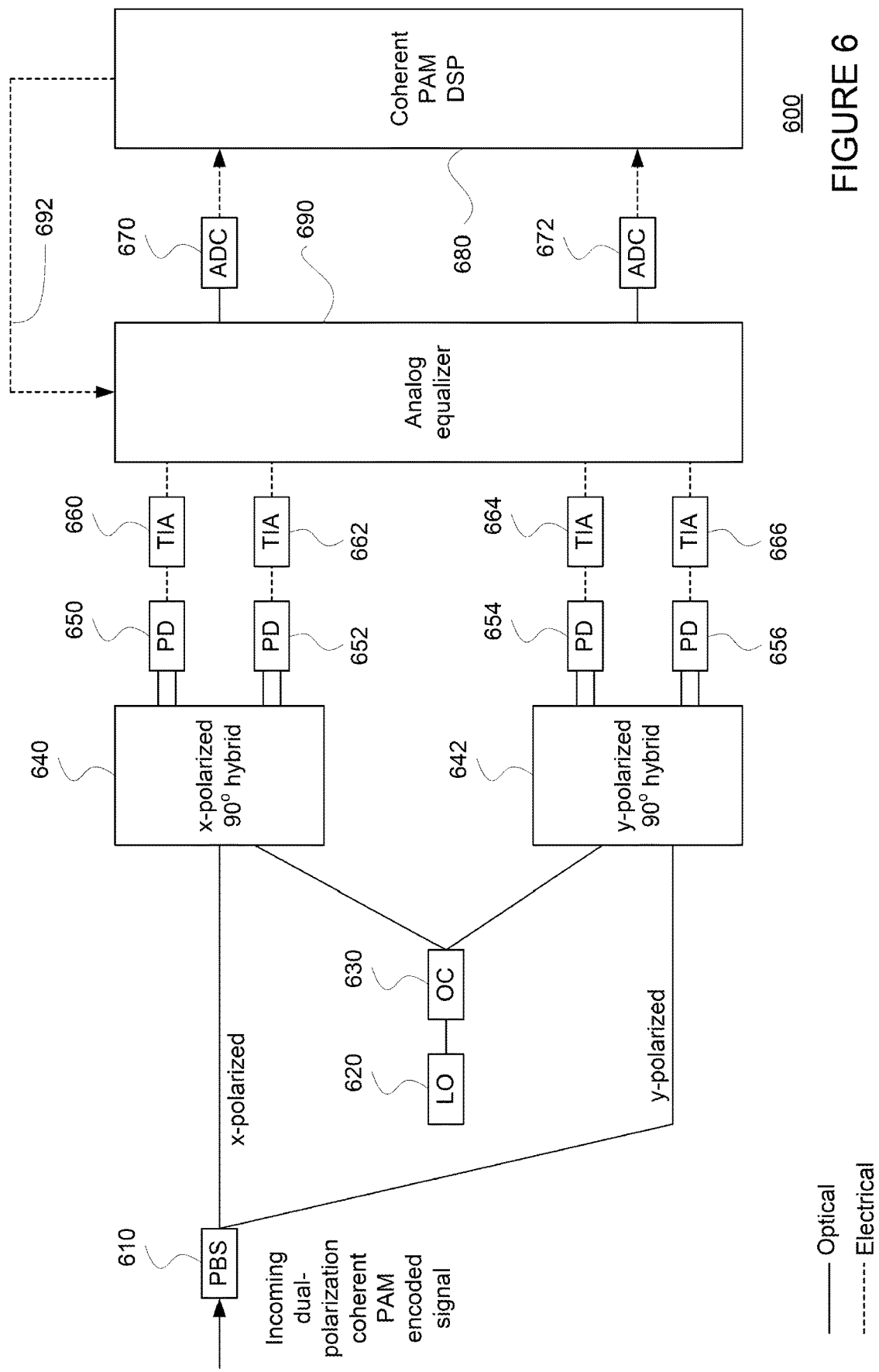
FIG. 6 shows an example receiver system with mixed analog and digital signal processing in accordance with aspects of the disclosure.

An efficient coherent PAM receiver system may be provided with mixed signal processing capabilities. As mentioned above, to receive and decode a one-dimensional signal, such as a coherent PAM encoded signal, a polarization-diverse and phase-diverse receiver system may be inefficient. First, a coherent PAM encoded signal uses only one carrier signal and do not include phase modulation, thus it is unnecessary to separate multiple phases. Further, where the coherent PAM encoded signal includes only a single polarization, it is also unnecessary to separate multiple polarizations. Accordingly, FIGS. 1A-4 show example receiver systems that use mixed optical and electrical signal processing. FIG. 6 shows example receiver system with mixed analog and digital processing. FIGS. 1A-3B show receiver systems where polarization and phase recovery are performed using two independent control circuitries or loops, while FIGS. 4A and 4B shows a receiver system where polarization and phase recovery are performed using a single control circuitry or loop through a joint polarization-diverse and phase-diverse coherent detection method. Each of these receiver systems may include one or more frequency control circuitry or loops for coarse and/or fine adjustments. FIGS. 5A, 5B, and 5C show example implementations of an optical polarization component that can be used in the joint polarization-diverse and phase-diverse coherent detection method.

Referring to FIG. 1A, an example coherent PAM receiver system 100A for receiving a single polarization coherent PAM encoded signal is shown. The receiver system 100A may receive an incoming signal from a transmitter system (not shown). For instance, a transmitter system may have generated a coherent carrier signal, and encoded with the carrier signal with data using a data modulator. For PAM encoding, the data modulator may be a high-speed optical modulator, such as a Mach-Zehnder Modulator (MZM). The data modulator may encode data by converting high-speed electrical data signal into high-speed optical data signal and add to the carrier signal. In this example, data is encoded in only one polarization, thus resulting in a single polarization coherent PAM encoded signal. Although the transverse electric (TE) mode polarized light beam, denoted as x-polarization, is shown in FIG. 1A as the polarization with encoded data, in other examples data may be encoded in any other polarization. The coherent PAM encoded signal may then be transmitted by the transmitter system to the receiver system 100A, such as through one or more optical fibers. While in transmission, various properties of the coherent PAM encoded signal, such as polarization, phase, and/or frequency, may change randomly.

To recover properties of the received single polarization coherent PAM encoded signal that may have changed during transmission, the receiver system 100A may also receive a signal from a Local Oscillator (LO) 120 as reference. An optical coupler (OC) 130 mixes the received coherent PAM encoded signal and the LO signal. For example, an optical polarization component, such as an optical polarization controller 110, may initially select x-polarized component of the coherent PAM encoded signal for passing through the OC 130, and an optical phase modulator 140 may initially allow the LO signal to pass through the OC 130 without modification to the phase or frequency. During the recovery process, the optical polarization controller 110 and the optical phase modulator 140 may change the polarization, frequency, and/or phase of the signals via feedback control loops with one or more processors, such as coherent PAM digital signal processor (DSP) 180, as described further below.

To be analyzed by the DSP 180, which is in the electrical domain, the mixed LO signal and the received single polarization coherent PAM encoded signal are converted into electrical and/or digital domains. For instance as shown, the mixed LO and coherent PAM encoded signal are passed through a photodetector (PD) 150 for converting from optical to electrical domain. In some instances the PD 150 may be a pair of balanced PDs configured to cancel common-mode noises. For example, the mixed signal may be used as input to each of the two PDs (shown as 2 solid lines), and the output of the two PDs may be combined into one electrical signal that cancels out the common-mode noises (shown as 1 dashed line). The electrical signal may be amplified by the transimpedance amplifier (TIA) 160. The amplified electrical signal may then be digitized by an analog to digital converter (ADC) 170. The digitized signal may be passed to the coherent PAM digital signal processor (DSP) 180 for analyses. As such, the configuration of receiver system 100A reduces the number of PD, TIA, and ADCs required by a factor of four as compared to a conventional polarization-diverse and phase-diverse receiver system.

One or more feedback control loops may be used between the DSP 180 and the optical polarization controller 110, the LO 120, and/or the optical phase modulator 140 in order to match properties of the LO signal and the received single polarization coherent PAM encoded signal. The DSP 180 may be one or more processors of any of a number of types, such as processors 820 of FIG. 8. The DSP 180 may determine adjustments to be made in the electrical domain, while the optical polarization controller 110, the LO 120, and/or the optical phase modulator 140 may make these adjustments in the optical domain. By analyzing effects of the adjustments, the DSP 180 may determine further adjustments to be made, until the DSP 180 determines that the properties of the LO signal sufficiently match the properties of the coherent PAM encoded signal. These feedback control loops are thus implemented by mixed optical and electrical components. The feedback control loops may be used to perform polarization, phase, and/or frequency recovery.

With respect to polarization recovery, a polarization feedback control loop 192 between the DSP 180 and the optical polarization controller 110 may be used. Polarization adjustments to be made may be determined by the DSP 180 in the electrical domain, and the optical polarization controller 110 may make these polarization adjustments to the received coherent PAM encoded signal in the optical domain. The optical polarization controller 110 may be an optical signal processor configured to change polarization of a coherent PAM encoded signal. As an example, the optical polarization controller 110 may be implemented using interferometers with variable phase shifters. The optical polarization controller 110 shown in FIG. 1A is a 1×1 optical polarization controller (1 input, 1 output). The DSP 180 may determine polarization adjustments to be made by analyzing beating signal power between the LO signal and the received single polarization coherent PAM encoded signal. Since the maximum achievable beating signal power between two signals may be achieved when the two signals have the same polarization, the DSP 180 may determine the polarization adjustments to be made by maximizing beating signal power between the LO signal and the x-polarized coherent PAM encoded signal. For instance, initially the DSP 180 may receive the LO signal and the x-polarized coherent PAM encoded signal, and determine an initial beating signal power. The DSP 180 may increase the polarization control coefficients, for example the required phase shifter control voltages, by a predetermined amount and instruct the optical polarization controller 110, via polarization feedback control loop 192, to adjust polarization of the coherent PAM encoded signal by the predetermined amount. Since the maximum beating signal power may not be known by the receiver system at the starting stage, multiple back and forth adjustments are usually needed until adjustments in either direction would decrease the power. After the adjustment, the DSP 180 may continue to receive LO signal and x-polarized coherent PAM encoded signal, and determine beating signal power. If the DSP 180 determines that, after the adjustment, the beating signal power between the LO signal and the x-polarized coherent PAM encoded signal increased due to the increased polarization control coefficients, the DSP 180 may further increase the polarization control coefficient, and the optical polarization controller 110 may apply this adjustment. Conversely, if the DSP 180 determines that the beating signal power between the LO signal and the x-polarized coherent PAM encoded signal decreased due to the increased polarization control coefficient, the DSP 180 may decrease the polarization control coefficient, and the optical polarization controller 110 may apply this adjustment. Further adjustments may be determined and applied until the beating signal power is maximized, for example to a predetermined threshold.

With respect to carrier frequency and/or phase recovery, one or more frequency and/or phase feedback control loops may be used between the DSP 180 and the LO 120 and/or optical phase modulator 140. Phase and/or frequency adjustments to be made may be determined by the DSP 180 in the electrical domain, and implemented by the LO 120 and/or the optical phase modulator 140 in the optical domain. In comparison to the high-speed data modulator, such as an MZM, that encodes data in the transmitter system, the optical phase modulator 140 in the receiver system 100A may be a low-speed optical modulator. Since laser phase changes for the carrier signal is much slower than the high-speed coherent PAM encoded signal, the required bandwidth for the optical phase modulator 140 may also be significantly lower than the required bandwidth for the data modulator in the transmitter system. By using a low-speed, low-bandwidth modulator as the optical phase modulator 140, the receiver system 100A may thus reduce power consumption.

The DSP 180 may determine the frequency adjustments to be made using fast Fourier transforms (FFT). FFT may also be a low-speed operation since laser frequency for the carrier signal typically changes very slowly compared to data rate of the coherent PAM encoded signal. As such, the DSP 180 may reduce power consumption by performing the low-speed operation, as compared to the high-speed operations involving the hybrids of receiver system 100. Based on the FFT, frequency offset between LO signal and the coherent PAM encoded signal may be estimated. Frequency adjustments may then be determined based on the frequency offset and applied via feedback control loop 194 and/or 196.

For instance, initially the DSP 180 may receive the LO signal and the coherent PAM encoded signal, and use FFT to determine an initial frequency offset between the LO signal and the coherent PAM encoded signal. The DSP 180 may increase the frequency control coefficient, for example the required temperature control voltage or laser drive current for the LO, by a predetermined amount and instruct the LO 120, via frequency feedback control loop 194, to adjust frequency based on the predetermined amount. Additionally or alternatively, the DSP 180 may instruct the optical phase modulator 140 via frequency/phase feedback control loop 196, to adjust frequency based on the predetermined amount. For example, coarse frequency adjustments may be made via frequency feedback control loop 194, while fine frequency adjustments may be made via feedback control loop 196. After the adjustment, the DSP 180 may continue to receive LO signal and coherent PAM encoded signal and use FFT to determine frequency offset. If the DSP 180 determines that, after the adjustment, the frequency offset between the LO signal and the single polarization coherent PAM encoded signal decreased due to the increased frequency control coefficient, the DSP 180 may further increase the frequency control coefficient, and the LO 120 and/or optical phase modulator 140 may apply this adjustment. Conversely, if the DSP 180 determines that the frequency offset between the LO signal and the single polarization coherent PAM encoded signal increased due to the increased frequency control coefficient, the DSP 180 may decrease the frequency control coefficient, and the LO 120 and/or optical phase modulator 140 may apply this adjustment. Further adjustments may be determined and applied until the frequency offset is minimized, for example to a predetermined threshold.

The DSP 180 may determine phase adjustments to be made using pilot data symbols. Pilot symbols are special data symbols which are known to a receiver system. Pilot symbols may be inserted by a transmitter system into the regular data symbols of an optical signal, such as the coherent PAM encoded signal, through time-division multiplexing. For example, the pilot symbols may be inserted in fixed time slots. For instance, initially a maximum achievable pilot symbol signal level, which represents the closest phase match between LO 120 and received coherent PAM encoded signal, may be measured and calibrated. This may be performed using training data with random LO phase change through the optical phase modulator 140. Once the maximum achievable pilot symbol signal level is calibrated, known pilot data symbols may be sent periodically by a transmitter system via the coherent PAM encoded signal to receiver system 100A. Based on the pilot symbol signal level of these known pilot data symbols, phase offset between LO signal and the coherent PAM encoded signal may be estimated, based on which adjustments may be determined and applied in phase feedback control loop 196.

For instance, initially the DSP 180 may receive the LO signal and pilot symbols encoded in the coherent PAM encoded signal, and determine an initial phase offset between the LO signal and the coherent PAM encoded signal based on the pilot symbol signal level. The DSP 180 may then increase the phase control coefficient, for example the required drive voltage for the optical Phase Modulator 140, by a predetermined amount and instruct the optical phase modulator 140, via phase feedback control loop 196, to adjust phase by the predetermined amount. After the adjustment, the DSP 180 may continue to receive LO signal and pilot symbols in the coherent PAM encoded signal, and determine phase offset based on the pilot symbol signal level. If the DSP 180 determines that, after the adjustment, the phase offset between the LO signal and the single polarization coherent PAM encoded signal decreased due to the increased phase control coefficient, the DSP may further increase the phase control coefficient, and the LO 120 and/or optical phase modulator 240 may apply this adjustment. Conversely, if the DSP 180 determines that the phase offset between the LO signal and the coherent PAM encoded signal increased due to the increased the phase control coefficient, the DSP may decrease the phase control coefficient, and the LO 120 and/or optical phase modulator 140 may apply this adjustment. Further adjustments may be determined and applied until the phase offset is minimized, for example to a predetermined threshold.

The receiver system 100A provide efficient recovery of encoded data in a number of ways. For instance as shown, one OC 130 is used instead of two hybrids in the conventional polarization-diverse and phase-diverse receiver. The number of PDs, TIAs, and ADCs are also reduced by a factor of four as compared to the conventional polarization-diverse and phase-diverse receiver. Further, instead of processing all polarization and phase information in the electrical domain, which may require high-speed operations, adjustments are made in the optical domain by optical components, such as the optical polarization controller 110, optical phase modulator 140, and LO 120, which may perform low-speed operations. Optical components such as optical polarization controller 110 and optical phase modulator 140 may also increase sensitivity of the receiver system without increasing processing power of the DSP 180. Additionally, the feedback control loops 192, 194, 196 may perform recovery of multiple properties simultaneously.

Figure 1B:
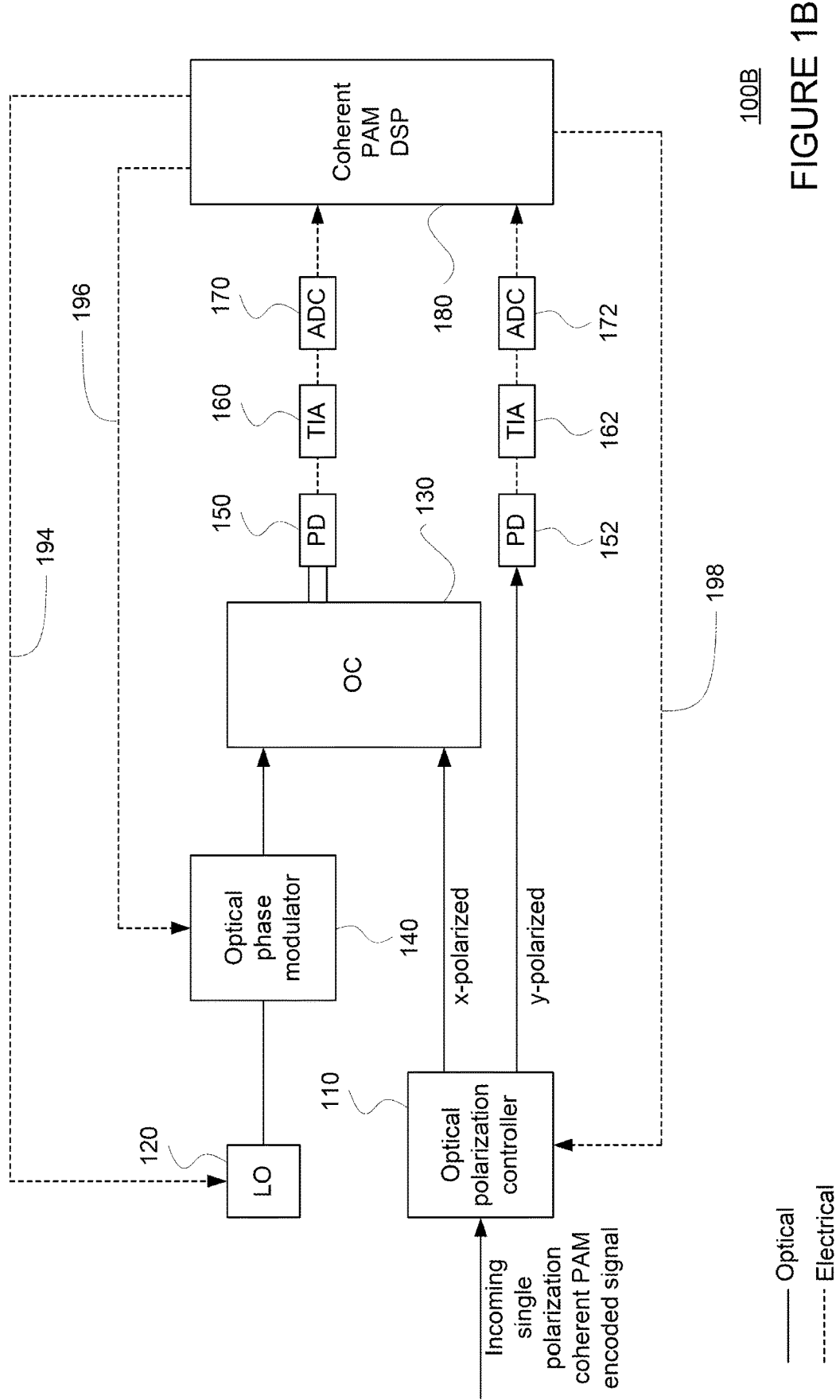

Alternatively or additionally, polarization recovery may be performed by monitoring the average optical power in a polarization state that is orthogonal to the signal polarization state. For instance, FIG. 1B shows another example coherent PAM receiver system 100B for receiving a single polarization coherent PAM encoded signal. The receiver system 100B is configured with similar components as the receiver system 100A of FIG. 1A, and is labeled as such. However, additional circuit elements are provided in receiver system 100B to measure optical power in a polarization that is orthogonal to the polarization of the encoded signal. For example as shown, the optical polarization controller 110 may select the TE-mode polarized signal denoted as x-polarized beam with the encoded data as output passing through the OC 130, and the TE-mode polarized signal converted from transverse magnetic (TM) mode signal denoted as y-polarized beam as output passing through a circuit including a set of PD 152, TIA 162, and ADC 172, and then to the DSP 180. The optical polarization controller 110 shown in FIG. 1B is a 1×2 optical polarization controller (1 input, 2 outputs).

To perform polarization recovery, the DSP 180 may maximize the average optical power in the x-polarized output by minimizing the average optical power in the y-polarized output in a polarization feedback control loop 198. For instance, initially the DSP 180 may measure an average optical power of the y-polarized output from the optical polarization controller 110. The DSP 180 may then increase the polarization control coefficient by a predetermined amount and instruct the optical polarization controller 110, via polarization feedback control loop 198, to adjust polarization of the coherent PAM encoded signal by the predetermined amount. After the adjustment, the DSP 180 may continue to receive y-polarized output from the optical polarization controller 110, and measure its average optical power. If the DSP 180 determines that, after the adjustment, the average optical power of the y-polarized output decreased due to the increased polarization control coefficient, the DSP 180 may further decrease the polarization control coefficient, and the optical polarization controller 110 may apply the adjustment. Conversely, if the DSP 180 determines that the average optical power of the y-polarized output increased due to the increased polarization control coefficient, the DSP 180 may decrease the polarization control coefficient, and the optical polarization controller 110 may apply the adjustment. Further adjustments may be determined and applied until the average optical power in the y-polarization is minimized, for example to a predetermined threshold.

The receiver system 100B provide efficient recovery of encoded data in a number of ways. For instance, one or more of the PD 152, TIA 162, and ADC 172 may be low-speed components, since only average optical power, not encoded data, is analyzed. By performing polarization recovery using components having a different polarization, polarization recovery for receiver system 100B may be decoupled from frequency and phase recovery. As such, the receiver system 100B may perform polarization recovery before, during, and/or after frequency and/or phase recovery, which provides additional flexibility.

In some instances, to increase data capacity, PAM encoded data may be added to two polarizations, which results in a dual-polarization coherent PAM encoded signal. In this regard, FIG. 2A shows an example coherent PAM receiver system 200A for receiving a dual-polarization coherent PAM encoded signal. As shown, incoming signal may be received by the receiver system 200A, which may be modulated by a transmitter system in both x- and y-polarizations with PAM encoded data. Although x- and y-polarizations are shown in FIG. 2A as the polarization with encoded data, in other examples data may be encoded in any other polarizations. The receiver system 200A is configured with similar components as the receiver system 100A of FIG. 1A, and is labeled as such. For example, similar components, such as OCs, PDs, TIAs, ADCs, LO, DSP, optical phase modulators, are also used in receiver system 200A. However, since the dual-polarization coherent PAM encoded signal includes data encoded to two different polarizations that carry two independent data signals, receiver system 200A includes some differences from the receiver system 100A.

For instance, an optical polarization component, such as a 1×2 optical polarization controller, may be provided to separate the received dual-polarization coherent PAM encoded signal into two polarized beams. In the example shown in FIG. 2A, an optical polarization demultiplexer 210 is used, which is a 1×2 optical controller where the two outputs are aligned to the two polarization multiplexed, orthogonal signals. The optical polarization demultiplexer 210 may initially separate the received dual-polarization coherent PAM encoded signal into an x-polarized beam and a y-polarized beam, and perform recovery using feedback control loops as described further below. These two polarized beams may each be analyzed by reference to a signal from an LO 220. As such, OC 234 may also separate the LO signal into two LO beams. Then, OC 230 mixes the x-polarized beam and the first LO beam, and OC 232 mixes the y-polarized beam and the second LO beam. The two mixed beams are then respectively converted from optical to electrical domains by respective PDs 250, 252, amplified by respective TIAs 260, 262, and digitized by respective ADCs 270, 272. One or more feedback control loops may be used between the DSP 280, optical polarization demultiplexer 210, LO 220, optical phase modulators 240, 242 to perform polarization, frequency, and/or phase recovery.

With respect to polarization recovery, a low-frequency RF dither signal may be used. The low-frequency RF dither signal may be added by the transmitter system (not shown) to either the x-polarized encoded data signal or the y-polarized encoded data signal to be transmitted. Since the RF dither signal was only added to one of the two polarizations, by maximizing the RF pilot tone of the dither signal in one polarized beam, and/or minimizing the RF pilot tone of the dither signal in the other polarized beam, the receiver system 200A may separate the two encoded data signals. For example, where the dither signal was added by the transmitter system to the x-polarized signal, then the receiver system 200A may perform polarization recovery by maximizing the RF pilot tone of the dither signal in the x-polarized beam; where the dither signal was added by the transmitter system to the y-polarized signal, then the receiver system 200A may perform polarization recovery by maximizing the RF pilot tone of the dither signal in the y-polarized beam.

Polarization adjustments may be determined and applied in a polarization feedback control loop 292 based on analyzing the pilot tone of the RF dither signal. For instance, the DSP 280 may initially determine the RF pilot tone of the dither signal in the x-polarized beam. The DSP 280 may then increase the polarization control coefficient by a predetermined amount and instruct the optical polarization demultiplexer 210, via polarization feedback control loop 292, to adjust polarization of the dual-polarization coherent PAM encoded signal by the predetermined amount. After the adjustment, the DSP 280 may continue to receive the dual-polarization coherent PAM encoded signal. If the DSP 280 determines that, after the adjustment, the RF pilot tone of the dither signal in the x-polarized signal increased due to the increased polarization control coefficient, the DSP 280 may further increase the polarization control coefficient, and the optical polarization demultiplexer 210 may apply this adjustment. Conversely, if the DSP 280 determines that the RF pilot tone of the dither signal in the x-polarized signal decreased due to the increased polarization control coefficient, the DSP 280 may decrease the polarization control coefficient, and the optical polarization demultiplexer 210 may apply this adjustment. Eventually, the RF pilot tone of the dither signal in the x-polarized signal may be maximized, for example to a predetermined threshold. Additionally or alternatively, the DSP 280 may determine adjustments to minimize the RF pilot tone of the dither signal in the y-polarized signal in the polarization feedback control loop 292, which may also be applied by the optical polarization demultiplexer 210.

With respect to carrier frequency and/or phase recovery, one or more frequency and/or phase feedback control loops may be used between the DSP 280 and the LO 220 and/or optical phase modulator 240, 242. Phase and/or frequency adjustments to be made may be determined by the DSP 280 in the electrical domain, and applied by the LO 220 and/or the optical phase modulators 240, 242 in the optical domain. For instance, frequency feedback control loop 294 may be configured similarly as frequency feedback control loop 194 of FIG. 1A. Likewise, frequency and/or phase feedback control loop 296 may be configured similarly as frequency and/or phase feedback control loop 196 of FIG. 1A, except that the adjustments to the two LO beams are applied respectively by the optical phase modulator 240 and the optical phase modulator 242.

The receiver system 200A provides efficient recovery of dual-polarization encoded data. To receive data encoded to two polarizations, the number of PDs, TIAs, and ADCs in receiver system 200A are reduced by a factor of two as compared to a polarization-diverse and phase-diverse receiver system. Further, instead of processing all polarization and phase information in the electrical domain, which may require high-speed operations, adjustments are made in the optical domain by optical components, which may perform low-speed operations. Optical components such as optical polarization demultiplexer 210 and optical phase modulators 240, 242 may also increase sensitivity of the receiver system without increasing processing power of the DSP 280. Additionally, the feedback control loops 292, 294, 296 may perform recovery of multiple properties simultaneously.

In some instances, the pilot tone of RF dither signal used for polarization described above may be monitored by an independent low-speed circuitry. For instance, FIG. 2B shows another example coherent PAM receiver system 200B for receiving a dual-polarization coherent PAM encoded signal. The receiver system 200B is configured with similar components as the receiver system 200A of FIG. 2A, and is labeled as such. However, an optical tap 212 may be added to divert some of the x-polarized beam to an additional set of PD 254, TIA 264, and ADC 274. The diverted x-polarized beam may be used to analyze pilot tone of RF dither signal inserted into the x-polarized beam, based on which polarization may be adjusted as described above. The set of PD 254, TIA 264, and ADC 274 may be low-speed components, since only average optical power, not encoded signal, is analyzed.

According to some examples, light from multiple lasers of different frequencies may be PAM encoded, which results in a coherent PAM encoded signal with multiple wavelengths, each carrying an independent data signal. This may result in increased data capacity. FIG. 3A shows an example coherent PAM receiver system 300A for receiving a coherent PAM encoded signal with multiple wavelengths. As shown, incoming signal may be received by the receiver system 300A, which may include multiple wavelengths each modulated by a transmitter system with PAM encoded data. Although four wavelengths are shown in FIG. 3A, which is typical when a coarse wavelength division multiplexing (CWDM) transceiver is used, in other examples data may be encoded in any number of wavelengths. The receiver system 300A is configured with similar components as the receiver system 100A of FIG. 1A, and is labeled as such. For example, similar components, such as OCs, PDs, TIAs, ADCs, LO, DSP, optical phase modulators, are also used in receiver system 300A. However, since the coherent PAM encoded signal received by receiver system 300A includes multiple wavelengths carrying multiple independent data signals, receiver system 300A includes some differences from the receiver system 300A.

For instance as shown, the multiple wavelengths may be separated by a demultiplexer into different beams, such as a coarse wavelength division multiplexing (CWDM) demultiplexer (DEMUX) 312. Further as shown, the optical polarization controller 310 may be placed before the CWDM DEMUX 312 in the receiver system 300A. As such, the single optical polarization demultiplexer 310 may change polarization of light before the different wavelengths are separated into different beams. This also allows a single polarization feedback control loop 392 to be used. One or more frequency and/or phase feedback control loops, such as frequency feedback control loop 394 and frequency and/or phase feedback control loop 396, may be used between the DSP 380, LO 320, and/or optical phase modulator 340 to perform frequency and/or phase recovery similarly as described for receiver system 100A. For ease of illustration, OC 330, optical phase modulator 340, PD 350, TIA 360, and ADC 370 are only shown for one of the wavelengths. However, in actual systems a separate set of OC, optical phase modulator, PD, TIA, and ADC may be required for each wavelength of the received PAM encoded signal.

The receiver system 300A is a more efficient multi-wavelength receiver than a polarization-diverse and phase-diverse receiver system. Although the receiver system 300A requires 4 sets of OCs, optical phase modulators, PDs, TIAs, and ADCs to receive the additional wavelengths, to receive a same number of wavelengths, a conventional polarization-diverse and phase-diverse receiver system would require 16 sets of PDs, TIAs, and ADCs, and 8 hybrids. Further, instead of processing all polarization and phase information in the electrical domain, which may be high-speed operations, adjustments are made by the receiver system 300A in the optical domain by optical components, which may be low-speed operations. Optical components such as optical polarization controller 310 and optical phase modulator 340 may also increase sensitivity of the receiver system without increasing processing power of the DSP 380. Additionally, the feedback control loops 392, 394, 396 may perform recovery of multiple properties simultaneously.

Further, polarization recovery for PAM encoded data with multiple wavelengths may also be performed by analyzing signals from a separate polarization. For instance, FIG. 3B shows another example coherent PAM receiver system 300B for receiving a coherent PAM encoded signal with multiple wavelengths. The receiver system 300B is configured with similar components as the receiver system 300A of FIG. 3A, and is labeled as such. However, referring to FIG. 3B, an optional circuit including PD 352, TIA 362, and ADC 372 may be provided to measure optical power in a polarization that is orthogonal to the polarization of the data signal. As such, receiver system 300B may perform polarization recovery as described for receiver system 100B. For example as shown, DSP 380 may be configured to minimize optical power of y-polarized light by instructing optical polarization controller 310 via feedback control loop 398.

Although receiver systems 300A and 300B shown are configured to receive single polarization coherent PAM encoded signals, the receiver systems 300A and 300B may also be extended to receive dual-polarization PAM encoded signals. For example, the optical polarization controller 310 may be replaced with an optical polarization demultiplexer for separating the two polarizations. Additional optical phase modulators, OCs, PDs, TIAs, and ADCs may be provided for the two polarizations. Recovery of phase and/or frequency may also be performed using additional feedback control loops for the two polarizations.

FIG. 4A shows another example receiver system 400A with mixed optical and electrical signal processing through joint polarization-diverse and phase-diverse detection. Referring to FIG. 4A, the receiver system 400A is configured with similar components as the receiver system 200A of FIG. 2A, and is labeled as such. For example, the receiver system 400A also includes an LO, a DSP, 3 OCs, and 2 sets of PDs, TIAs, ADCs. However, instead of an optical polarization demultiplexer for polarization recovery and two optical phase modulators for frequency and/or phase recovery as shown in FIG. 2A, the receiver system 400A includes a 1×2 optical polarization controller 410 configured to introduce a 45° polarization angle between the received signal after polarization adjustment and the LO, and followed by a joint polarization-diverse and phase-diverse detection circuitry. Thus, only a single control loop is required to control the 1×2 polarization controller to enable joint polarization-diverse and phase-diverse coherent detection. Final polarization and phase recovery may be achieved in the electrical domain.

For instance as shown, the incoming dual-polarization coherent PAM encoded signal may be represented by vectors $A_{in}$ and $B_{in}$, where $A_{in}$ and $B_{in}$ are two orthogonally-polarized optical signals carrying independent data. A 1×2 optical polarization controller 410 may change the polarization of the incoming dual-polarization coherent PAM encoded signal $A_{in}$ and $B_{in}$, to output $A_{out}$ and $B_{out}$. In this regard, the 1×2 optical polarization controller 410 may adjust the polarization of $A_{in}$ and $B_{in}$ such that the resulting $A_{out}$ and $B_{out}$ are still orthogonal to each other, but the resulting $A_{out}$ is 45° from a reference axis and aligned with the LO polarization. In this regard the reference axis may be one of the two principal axes of the PBS labeled as x- and y-axis. For example, $A_{out}$ may be 45° from the y-axis in one direction, while $B_{out}$ may be 45° from the y-axis in an opposite direction, making $A_{out}$ 90° from $B_{out}$. As such, the 1×2 optical polarization controller 410 may generate two outputs $$X_{out} = A_{out\_x} + B_{out\_x} = \frac{\sqrt{2}}{2}A_{in} - \frac{\sqrt{2}}{2}B_{in} \text{ and } Y_{out} = A_{out\_y} + B_{out\_y} = \frac{\sqrt{2}}{2}A_{in} + \frac{\sqrt{2}}{2}B_{in},$$

where $A_{out\_x}$ is x component of $A_{out}$, $A_{out\_y}$ is y component of $A_{out}$, $B_{out\_x}$ is x component of $B_{out}$ and $B_{out\_y}$ is y component of $B_{out}$.

Further as shown, the LO signal from LO 420 may be split by OC 434 into two signals, LO1 and LO2. OC 434 may introduce a $\pi/2$ phase difference between LO1 and LO2. For example, a 3 dB OC that separates a beam using a cross path and a parallel path may have a $\pi/2$ phase difference between the two paths. Then, OC 430 may mix $X_{out}$ with LO1, and generate two outputs $C_{x+}=\frac{1}{2}A_{in}-\frac{1}{2}B_{in}+j\frac{1}{2}E_L$, and $C_{x-}=\frac{1}{2}jA_{in}-\frac{1}{2}jB_{in}+\frac{1}{2}E_L$, where $E_L$ denotes the complex optical field of LO1, and $jE_L$ denotes the complex field of LO2. Likewise, OC 432 may mix the $Y_{out}$ with LO2, and generate two outputs $C_{y+}=\frac{1}{2}A_{in}+\frac{1}{2}B_{in}-\frac{1}{2}E_L$, and $C_{y-}=\frac{1}{2}jA_{in}+\frac{1}{2}jB_{in}+\frac{1}{2}jE_L$.

Outputs from OC 430 and OC 432 are then respectively passed through PDs 450, 452 for optical to electrical conversion, TIAs 460, 462 for amplification, and ADCs 470, 472 for electrical to digital conversion, resulting in two digitized electrical signals. The two digitized electrical signals may be represented by $D_x=A_{in}E_L \sin(\varphi_x)-B_{in}E_L \sin(\varphi_y)$, and $D_y=A_{in}E_L \cos(\varphi_x)+B_{in}E_L \cos(\varphi_y)$, where $\varphi_x$ is the relative carrier phase difference between the received signal $A_{out}$ and the LO, while $\varphi_y$ is the relative carrier phase difference between the received signal $B_{out}$ and the LO.

DSP 480 may determine the carrier phase differences using pilot data symbol based carrier phase estimation algorithms. For instance, two known PAM pilot data symbols, such as d1 and d2, may be inserted into the two orthogonally-polarized incoming coherent PAM encoded signal at different time slots. For example, d1 may be inserted in one polarization channel, for example channel for $A_{in}$, at time slot n, while d2 may be inserted in another polarization channel, for example channel for $B_{in}$ at time slot n+1. The received digitized pilot data symbol of d1 may then be given by $D_{1(n)x}=A_{in}E_L \sin(\varphi_x)$, and $D_{1(n)y}=A_{in}E_L \cos(\varphi_x)$. The DSP 480 can then solve the two equations to extract $\varphi_x$. The digitized pilot data symbol of d2 can be given by $D_{2(n+1)x}=-B_{in}E_L \sin(100_y)$, and $D_{2(n+1)y}=B_{in}E_L \cos(\varphi_y)$. The DSP 480 can then solve the two equations to extract $\varphi_y$.

Further, DSP 480 may also determine polarization information of the incoming signals using the pilot data symbol. For instance, once the values of $\varphi_x$ and $\varphi_y$ are obtained, $A_{in}$ and $B_{in}$ can be determined by the DSP 480 based on the above relationships $D_x=A_{in}E_L \sin(\varphi_x)-B_{in}E_L \sin(\varphi_y)$, and $D_y=A_{in}E_L \cos(\varphi_x)+B_{in}E_L \cos(\varphi_y)$. Then, DSP 480 may determine polarization states of $A_{out}$ and $B_{out}$ based on $A_{in}$ and $B_{in}$, and the relationships above for the digitized pilot data symbols $D_{1(n)x}$, $D_{1(n)y}$, $D_{2(n+1)x}$, $D_{2(n+1)y}$. Further, since the current polarization adjustments applied by the 1×2 optical polarization controller 410 to the $A_{in}$ and $B_{in}$ are also known, polarization states of $A_{in}$ and $B_{in}$ may be deduced from the polarization of $A_{out}$ and $B_{out}$. Since polarization of the incoming signals may change randomly, dynamic adjustments may need to be applied to maintain a 45° difference between $A_{out}$ and the reference axis.

As such, the current polarization states of the incoming signal $A_{in}$ and $B_{in}$ are determined, the DSP 480 may determine the appropriate adjustments to be made by the 1×2 optical polarization controller 410 via polarization control loop 492. For instance, DSP 480 may determine polarization offsets between $A_{in}$ (and/or $B_{in}$) and the LO signal, and determine adjustments to be made to $A_{in}$ (and/or $B_{in}$) to ensure that $A_{out}$ have a 45° offset from the reference y-axis, which would typically be aligned with the polarization of the LO. The purpose to have a 45° polarization angle between $A_{out}$ (and/or $B_{out}$) and the LO is to make sure that the signal components of $A_{out}$ and $B_{out}$ can be equally distributed over the two output ports $X_{out}$ and $Y_{out}$ of the 1×2 polarization controller. As such, half of $X_{out}$ (or $Y_{out}$) comes from $A_{out}$ and another half comes from $B_{out}$. As shown by the formulae above, such a two-port equal signal components distribution could enable joint polarization-diverse and phase-diverse coherent detection, in which the polarization diverse detection circuitry and the phase diverse detection circuitry are combined into a single circuitry, which includes the 1×2 optical polarization controller 410, two optical couplers 430, 432, two sets of PDs 450, 452, TIAs 460, 462 and ADCs 470, 472, as well as the DSP 480. In contrast, with conventional polarization-diverse and phase-diverse coherent detection, in addition to the DSP, two hybrids plus four sets of PDs, TIAs and ADCs are needed.

Since relatively accurate incoming signal polarization and phase information can be extracted from the pilot data symbol as analyzed using the relationships above, only one polarization adjustment by the 1×2 optical polarization controller 410 may be needed for each change of incoming signal polarization through the control loop 492. This could improve the response time of the polarization controller as compared to the conventional trial and error based feedback control algorithms, where typically multiple polarization adjustments are needed for each polarization change. Note that here the polarization control loop is not used to align the received signal polarization to the LO in the optical domain like the receiver systems shown in FIGS. 1A-3B. Instead, the polarization control loop 492 is used to enable joint polarization-diverse and phase-diverse coherent detection. For this method, the final polarization and phase recovery are achieved in the electrical domain by the DSP 480 using the relationships described above. Furthermore, in the feed-forward based polarization and phase recovery algorithms, polarization and phase errors can be estimated and removed from the current data symbols without feedback delay, which may improve overall polarization and phase tracking speed. Especially, the use of fast feedforward based phase recovery algorithms could improve the laser phase noise tolerance.

The receiver system 400A is a more efficient multi-wavelength receiver than a polarization-diverse and phase-diverse receiver system. For instance, the receiver system 400A requires 2 sets of PDs, TIAs, and ADCs, as compared to the 4 sets required by conventional polarization-diverse and phase-diverse receiver system. The receiver system 400A also uses only one optical polarization controller, instead of two hybrids in the conventional polarization-diverse and phase-diverse receiver system, or the two optical phase modulators in the receiver system 200A. Further, instead of processing all polarization and phase information in the electrical domain, which may be high-speed operations, adjustments are made by the receiver system 400A in the optical domain by optical components, which may be low-speed operations. Optical components such as the 1×2 optical polarization controller 410 may also increase sensitivity of the receiver system without increasing processing power of the DSP 480. Additionally, the single control circuitry or loop allows recovery of multiple properties, which may be performed simultaneously.

Further, polarization recovery for the example system with joint polarization- and phase-diverse detection may also be performed by analyzing signals from a separate polarization. For instance, FIG. 4B shows another example coherent PAM receiver system 400B with joint polarization- and phase-diverse detection. The receiver system 400B is configured with similar components as the receiver system 400A of FIG. 4A, and is labeled as such. However, referring to FIG. 4B, an optional circuit including PD 454, TIA 464, and ADC 474 may be provided to measure pilot tone of dither signals in the incoming signals. As such, receiver system 400B may perform polarization recovery similarly as described for receiver system 200B. For example as shown, polarization offsets may be monitored by inserting two low-speed dither signals into the two orthogonally-polarized channels for $A_{in}$ and $B_{in}$, and the pilot tones may then be monitored by the DSP 480 using low-speed components including optical tap 412, PD 454, TIA 464, ADC 474. The introduction of this additional low-speed polarization control loop enables independent polarization adjustment of the 1×2 polarization controller 410 without performing carrier phase recovery and timing synchronization, which may simplify the receiver control loop design.

Although FIGS. 4A and 4B show the example receiver systems 400A and 400B configured for receiving a dual-polarization coherent PAM encoded signal with a single wavelength, features of the receiver system may be extended for receiving single polarization signals and signals with multiple wavelengths. For instance, for receiving single polarization coherent PAM encoded signal, the receiver system 400A may perform the same operations, but assuming either $A_{in}$ or $B_{in}$ to be zero. For receiving a coherent PAM encoded signal with multiple wavelengths, a wavelength demultiplexer such as a CWDM demultiplexer may be added similarly as shown in FIG. 3A.

FIGS. 5A, 5B, and 5C show example implementations for a 1×2 optical polarization controller. Referring to FIG. 5A, 1×2 optical polarization controller 500A includes a PBS 510 that splits the incoming dual-polarization coherent PAM encoded signal including $A_{in}$ and $B_{in}$ into two beams $X_{in}$ and $Y_{in}$. Then, phase shifter 520 makes phase adjustments to one of the split beams. For example as shown, phase of the beam $X_{in}$ is changed by phase shifter 520 based on adjustments determined by the DSP 480. The adjusted beam $X_{out}$ and unadjusted beam $Y_{in}$ may then pass through OC 530 for further processing. Here the received signal polarization is adjusted by changing the relative phase between its X-component and Y-component. The relative phase adjustment can be made by only adjusting the phase for the X-component or by adjusting the phase for both the X-component and the Y-component. Less voltage applied to the phase shifter is required if phase adjustments are made to both the X- and Y-components.

Referring to FIG. 5B, 1×2 optical polarization controller 500B includes similar components as 1×2 optical polarization controller 500A, and is labeled as such. However, the 1×2 optical polarization controller 500B further includes a second phase shifter 540. The second phase shifter 540 may change phase of the beam $Y_{in}$ based on adjustments determined by DSP 480. The adjusted beams)(out and $Y_{out}$ may then pass through OC 530 for further processing. For example as shown, a second-stage 2×2 MZI with phase shifter 550 may be used. The second stage 2×2 MZI 550 may be used to further reduce the required control voltage for each phase shifter. It may also be used to enable IM-DD PAM and coherent PAM two-mode operation as described below, where all the signal components of $A_{in}$ (or $B_{in}$) are directed to one of the two output ports of the 1×2 polarization controller.

Referring to FIG. 5C, 1×2 optical polarization controller 500C includes similar components as 1×2 optical polarization controller 500B, and is labeled as such. However, the 1×2 optical polarization controller 500C is further configured to receive a coherent PAM encoded signal with multiple wavelengths. In this regard, one or more wavelength demultiplexers, such as CWDM DEMUX 560 and CWDM DEMUX 562, are provided. As shown, CWDM DEMUX 560 splits the various wavelengths in beam $X_{in}$ into separate beams, and CWDM DEMUX 562 splits the various wavelengths in beam $Y_{in}$ into separate beams. The multiple wavelengths may share the same PBS 510 and CWDM DEMUX 560 and 562, but may not share the same phase shifters, OC, and second-stage 2×2 MZI with phase shifter. Thus, although not shown, a separate set of phase shifters, OC, and second-stage 2×2 MZI with phase shifter may be required for each wavelength received.

Instead of or in addition to mixed optical and electrical processing, a coherent PAM receiver may be provided with mixed analog and digital processing. For instance, FIG. 6 shows an example coherent PAM receiver with mixed analog and digital processing for receiving dual-polarization coherent PAM encoded signal. As shown, the receiver system 600 includes some similar components as a polarization-diverse and phase-diverse, such as PBS 610, LO 620, OC 630, two hybrids 640, 642, four sets of PDs 650, 652, 654, 656, and TIAs 660, 662, 664, 666, and DSP 680. However, to perform mixed analog and digital processing, receiver system 600 includes some differences from a polarization-diverse and phase-diverse receiver system.

For instance, the receiver system 600 further includes an analog equalizer 690 for performing both polarization and carrier phase recovery. As an example, the analog equalizer 690 may be a 4×2 analog multiple-input-multiple-output (MIMO) equalizer. To perform polarization and carrier phase recovery, the analog equalizer 690 may receive four inputs from the four respective PDs/TIAs, which may include detected in-phase component in x-polarization (Ix), detected quadrature component in x-polarization (Qx), detected in-phase component in y-polarization (Iy), and quadrature component in y-polarization (Qy). Note that although PAM signal has no quadrature components, the carrier has quadrature components. Unless the carrier phase is removed and the signal and LO polarization is aligned prior to coherent mixing as shown in FIG. 1A-3B, polarization-diverse and phase-diverse coherent detection circuitry is needed. Based on these inputs, the analog equalizer 590 may generate analog outputs to the DSP 680. For instance, the analog equalizer 590 may generate two polarization and phase recovered real-valued signals, Ix_output and Iy_output, where Ix_output denotes the PAM signal carried over the X-polarization channel while Iy_output denotes the PAM signal carried over the Y-polarization channel. For example, Ix_output and Iy_output may be generated based on the relationships Ix_output=$C_1$Ix+$C_2$Qx+$C_3$Iy+$C_4$Qy, and Iy_output=$D_1$Ix+$D_2$Qx+$D_3$Iy+$D_4$Qy, where $C_n$ and $D_m$ are equalizer coefficients. The outputs may be converted into digital outputs by ADCs 670 and 672 before being passed to DSP 680.

The coefficients to be used by the analog equalizer 690 may be determined by the DSP 680 using one or more control loops, such as feedback control loop 692. In this regard, the DSP 680 may make various determinations in the digital domain, while the analog equalizer 690 may make various determinations in the analog domain. For instance, initially the analog equalizer 690 may detect the Ix, Qx, Iy and Qy, and calculate Ix_output and Iy_output using predetermined coefficients. The analog equalizer 690 may then send the Ix_output and Iy_output to the DSP 680. Based on the Ix_output and the Iy_output, the DSP 580 may determine new coefficients to be used by the analog equalizer 690, and instruct the analog equalizer 690 via feedback control loop 692. The analog equalizer coefficients may be obtained by the DSP 680 by comparing the two outputs of the analog equalizer 690 with the expected PAM signal level distributions using classic gradient descent based algorithms such as the well known least mean square (LMS) algorithm. The analog equalizer 690 may then continue to detect the Ix, Qx, Iy and Qy, and use the new coefficients to calculate another set of Ix_output and Iy_output, which are again sent to the DSP 680. Further coefficients may be determined by the DSP 680 and used by the analog equalizer 690 until the calculated mean square error through the LMS algorithm is below a predetermined threshold or reach its minimum. Thus, the feedback control loops 692 enables both polarization and phase recovery, which may also be simultaneous.

The receiver system 600 provide efficient recovery of encoded data using mixed analog and digital processing. For instance, by using the 4×2 analog MIMO equalizer, the required number of ADCs are reduced by a factor of two as compared to the receiver system 100, which results in power saving. The receiver system 600 with mixed analog and digital signal processing may also be extended for receiving a coherent PAM encoded signal with multiple wavelengths. For instance, a mixed analog and digital processing receiver for 4 wavelengths may require 8 hybrids and 16 sets of PDs and TIAs, but only 8 ADCs, unlike a polarization-diverse and phase-diverse receiver system that would require 16 ADCs for receiving 4 wavelengths. Thus, the receiver system 600 is also a more efficient multi-wavelength receiver.

Although the example receiver systems described above include either mixed optical/electrical signal processing, or mixed analog/digital signal processing, other combinations may be used. For example, a receiver system may include mixed optical and analog signal processing, where functions of the DSP is implemented using analog circuits, which may further reduce power consumption. As another example, a receiver system may include mixed optical/analog/digital signal processing, where some functions of the DSP are moved to analog circuits while others are performed digitally, which may also reduce power consumption of the DSP.

Figure 7A:
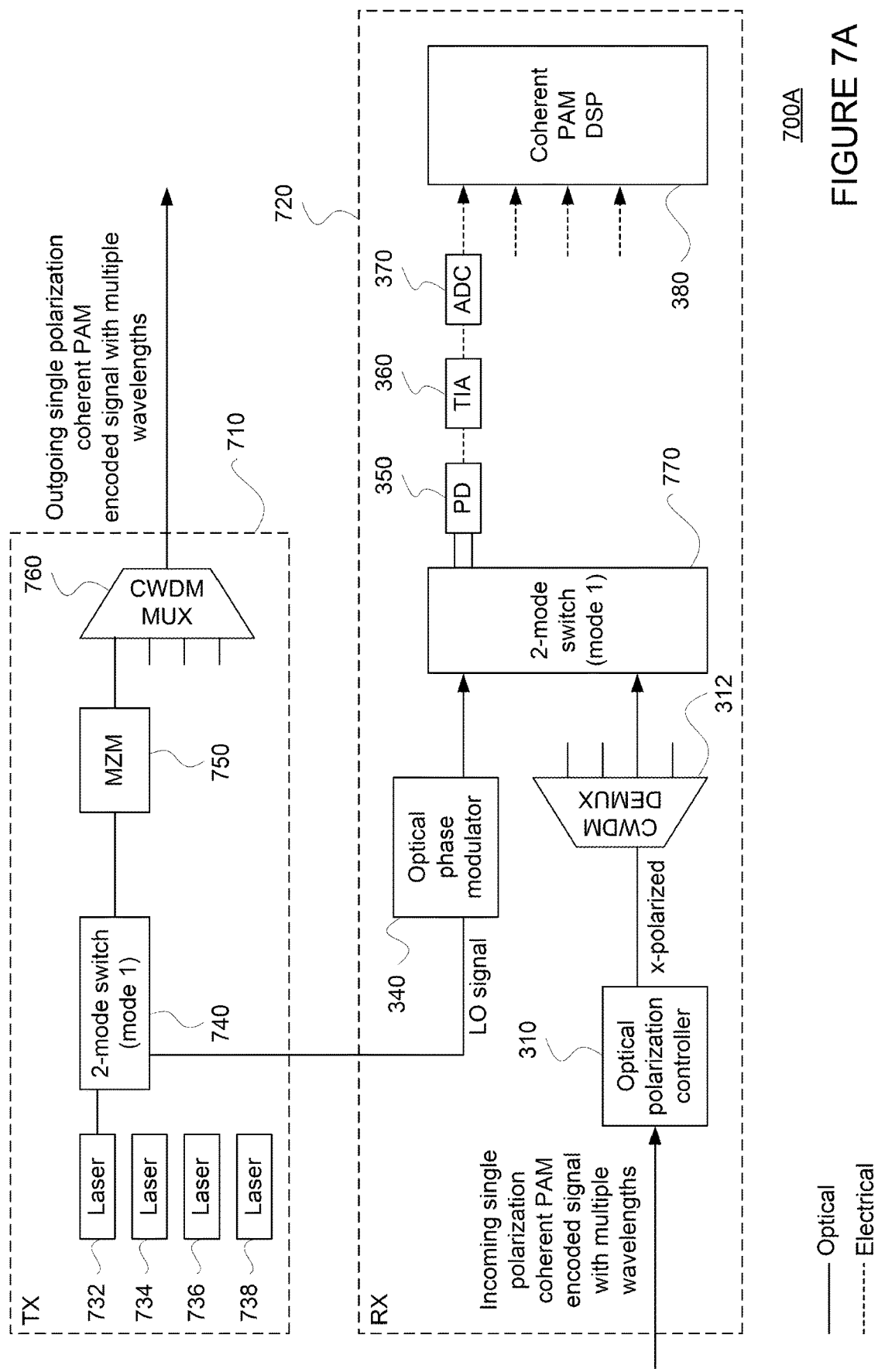
FIGS. 7A and 7B show example transmission systems with mixed signal processing in accordance with aspects of the disclosure.
Figure 7B:
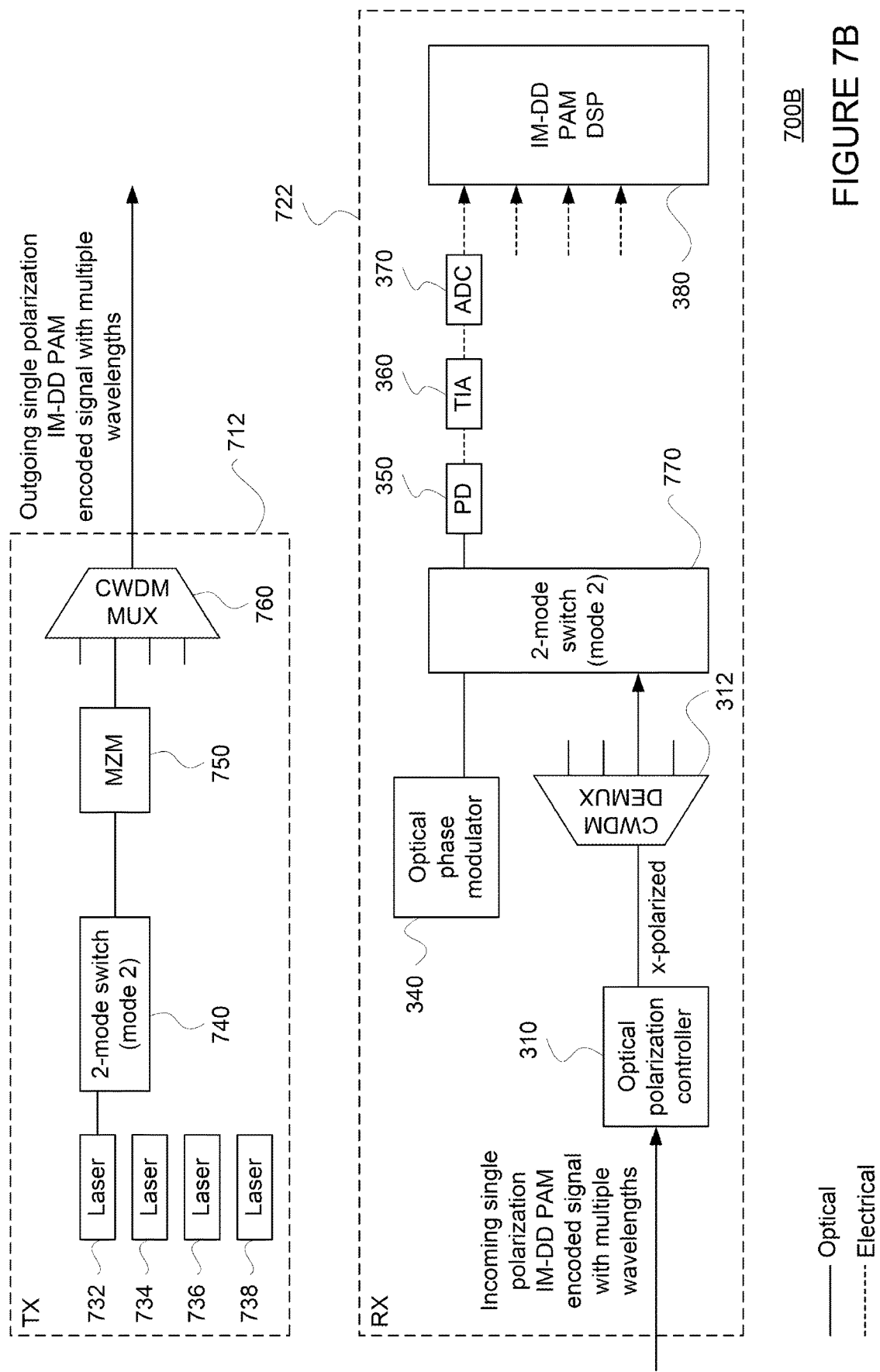

Although the example receiver systems described above are shown to process coherent PAM encoded signals, each of the example receiver systems may be further configured with compatibility to IM-DD PAM encoded signals. In this regard, the receiver systems described above may be provided with two modes—a first mode for receiving coherent PAM encoded signals, and a second mode for receiving IM-DD PAM encoded signals. For instance, if signals are received from a coherent PAM transmitter system, the receiver system may be configured in the first mode; and if signals are received from an IM-DD PAM transmitter system, the receiver system may be configured in the second mode. FIGS. 7A and 7B show an example transmission system where the receiver system performs mixed signal processing. In FIG. 7A, the transmission system 700A is configured to communicate using a coherent PAM encoded signal. In FIG. 7B, the transmission system 700B is configured to communicate using an IM-DD PAM encoded signal.

Referring to FIG. 7A, the coherent PAM transmission system 700A includes a coherent PAM transmitter system 710 and a coherent PAM receiver system 720. Although four lasers with four wavelengths are shown in FIG. 7A, in other examples data may be encoded in any number of wavelengths. For ease of illustration, operations involving only one wavelength is shown (as lines and arrows), but it should be understood that analogous operations may be performed for each of the wavelengths. Further, components such as 2-mode switches 740 and 770, MZM 750, optical phase modulator 340, CWDM DEMUX 312, CWDM MUX 760, PD 350, TIA 360, and ADC 370 are only shown for one of the wavelengths. However, a separate set of 2-mode switches, MZM, optical phase modulator, CWDM MUX and DEMUX, PD, TIA, and ADC may be required for each wavelength of the received PAM encoded signal. Still further, control loops for recovery of polarization, phase, and/or frequency are also omitted.

The coherent PAM transmitter system 710 may encode data on coherent carrier light for transmission. For example, the coherent PAM transmitter system 710 may include one or more lasers, such as lasers 732, 734, 736, 738 shown, which may emit light of different four wavelengths. The emitted light from each laser may be passed through a switch, such as 2-mode switch 740. In this regard, the 2-mode switch 740 may be set to a first mode for transmitting coherent PAM signals. In this first mode, the 2-mode switch essentially acts as an OC, which allows part of the emitted light to be PAM encoded by a data modulator, such as an MZM 750, while also diverts part of the emitted light to the receiver system 720 to be used as an LO signal. The 2-mode switch may be implemented using a silicon photonics based Mach-Zehnder interferometer. For example, the 2-mode switch 740 may be a 2×2 Mach-Zehnder interferometer (MZI), in which the operation mode can be switched by adjusting the relative phase between the two paths of the MZI. Further as shown, the encoded light from the different lasers may then be combined by a wavelength multiplexer, such as a CWDM MUX 760. The coherent PAM encoded signal with multiple wavelengths may then be transmitted to the coherent PAM receiver system 720, for example via one or more optical fibers.

The coherent PAM receiver system 720 may then receive the coherent PAM encoded signal with multiple wavelengths from the transmitter system 710. In this example, the coherent PAM receiver system 720 is configured with similar components as the receiver system 300A of FIG. 3A, and is labeled as such. However, to provide backward interoperability, the coherent PAM receiver system 720 includes some differences from the receiver system 300A. For instance, OC 330 of receiver system 300A is replaced with 2-mode switch 770. To receive coherent PAM encoded signal, the 2-mode switch 770 may be set in a first mode, which essentially acts as the OC 330 of receiver system 300A. Like the 2-mode switch 740, the 2-mode switch 770 may also be implemented using a silicon photonics based Mach-Zehnder interferometer, such as a 2×2 MZI Thus in the first mode, the receiver system 720 is configured the same way as the receiver system 300A of FIG. 3A.

The coherent PAM transmission system 700A may be re-configured into an IM-DD PAM transmission system. For instance, referring to FIG. 7B, the IM-DD PAM transmission system 700B includes an IM-DD PAM transmitter system 712 and an IM-DD PAM receiver system 722. As shown, the IM-DD PAM transmitter system 712 is configured with similar components as the coherent PAM transmitter system 710 of FIG. 7A, and the IM-DD PAM receiver system 722 is configured with similar components as the coherent PAM receiver system 720 of FIG. 7A. Further, to ensure compatibility, the number of lasers in the IM-DD PAM transmission system 700B remains the same as the coherent PAM transmission system 700A. However, to perform IM-DD PAM transmission, IM-DD PAM transmission system 700B includes some differences from the coherent PAM transmission system 700A.

For instance, in the IM-DD PAM transmitter system 712, the 2-mode switch 740 is set to a second mode. Since only intensity is modulated for IM-DD PAM, there is no need for an LO signal as reference. As such, in the second mode the 2-mode switch 740 may direct all laser power from a laser to the signal path of the IM-DD PAM receiver system 722. Thus as shown, all laser power from the laser 732 is directed by the 2-mode switch 740 to be modulated by a data modulator, which may also be an MZM 750. Thus, to change from coherent PAM transmission to IM-DD PAM transmission, all that is required is to change the mode for 2-mode switch 740 and the modulation performed by the MZM 750.

Likewise, in the IM-DD PAM receiver system 722, the 2-mode switch 770 is set to a second mode. Since data was only encoded by intensity for IM-DD PAM, there is no need to perform polarization, frequency, and/or phase recovery with a LO signal. As such, in the second mode the 2-mode switch 770 may act as a switch that receives all laser power for each wavelength. For instance, the received laser power for one wavelength may then be converted from optical to electrical domain by PD 350, amplified by TIA 360, digitized by ADC 370, and then analyzed and decoded by DSP 380. Further, since only total intensity is measured, there is no need for canceling common-mode noise. Thus, where a pair of balanced PDs are used, in the second mode the 2-mode switch 770 may direct all received optical power for each wavelength to one of the PDs.

Although the transmission systems 700A and 700B are shown with receiver systems 720 and 722 configured similarly as receiver system 300A, the receiver systems may alternatively configured as any of the receiver systems described in FIGS. 1A-4B, and 6. For example, to receive dual-polarization coherent PAM encoded signal, the optical polarization controller 310 may be replaced with an optical polarization demultiplexer as in receiver system 200A or 200B, or by a 2×1 optical polarization controller as in receiver system 400A or 400B. Additional optical phase modulators, OCs, PDs, TIAs, and ADCs may be provided for the two polarizations. As another example, the receiver system in transmission systems 700A and 700B may be configured with mixed analog and digital processing, such as shown in FIG. 6.

Figure 8:
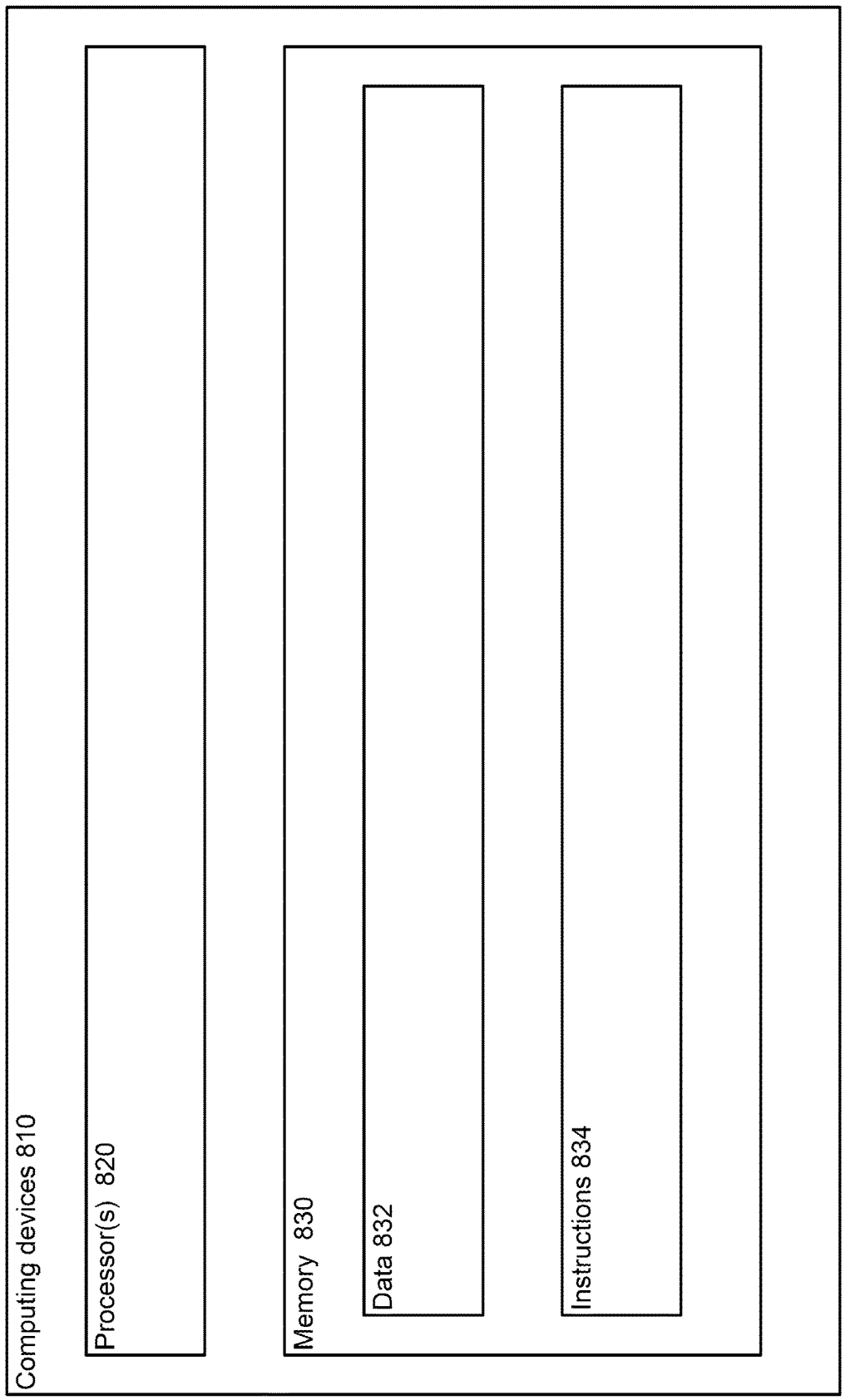
FIG. 8 is a block diagram showing an example receiver system in accordance with aspects of the disclosure.

FIG. 8 illustrates an example block diagram of some components in a receiver system, such as receiver system 100A, 100B, 200A, 200B, 300A, 300B, 400A, 400B, or 600. It should not be considered as limiting the scope of the disclosure or usefulness of the features described herein. In this example, the receiver system is shown with one or more computing devices 810. The computing devices 810 contains one or more processors 820, memory 830 and other components typically present in general purpose computing devices. Memory 830 of the computing devices 810 can store information accessible by the one or more processors 820, including instructions 834 that can be executed by the one or more processors 820.

Memory 830 can also include data 832 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories. For example, the data 832 may include parameters, thresholds, and other values for performing polarization, frequency, and/or phase recovery.

Data 832 may be retrieved, stored, or modified by the one or more processors 820 in accordance with the instructions 834. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, propriety codes, pointers, references to data stored in other memories such as at other network locations, or information that is used by a function to calculate the relevant data.

The instructions 834 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. For instance, the instructions 834 may include functions or methods for performing polarization, frequency, and/or phase recovery.

The one or more processors 820 can be any conventional processors, such as a commercially available CPU. Alternatively, the processors can be dedicated components such as an application specific integrated circuit ("ASIC") or other hardware-based processor. For example, DSP 180, 280, 380, 480, and 680 may be configured as the one or more processors 820, with access to memory such as data and instructions. Although not necessary, one or more of the computing devices 810 may include specialized hardware components to perform specific computing processes.

Although FIG. 8 functionally illustrates the processor, memory, and other elements of computing devices 810 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 810. Accordingly, references to a processor, computer, computing device, or memory will be understood to include references to a collection of processors, computers, computing devices, or memories that may or may not operate in parallel. For example, the computing devices 810 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over a network.

The computing devices 810 may be capable of directly and indirectly communicating with other transmitter systems and/or receiver systems over a network. Computing devices in a network, such as computing devices 810, may be interconnected using various protocols and systems, such that computing devices in the network can be part of the Internet, World Wide Web, specific intranets, wide area networks, or local networks. Computing devices in the network can utilize standard communication protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Example Methods

Further to example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 9:
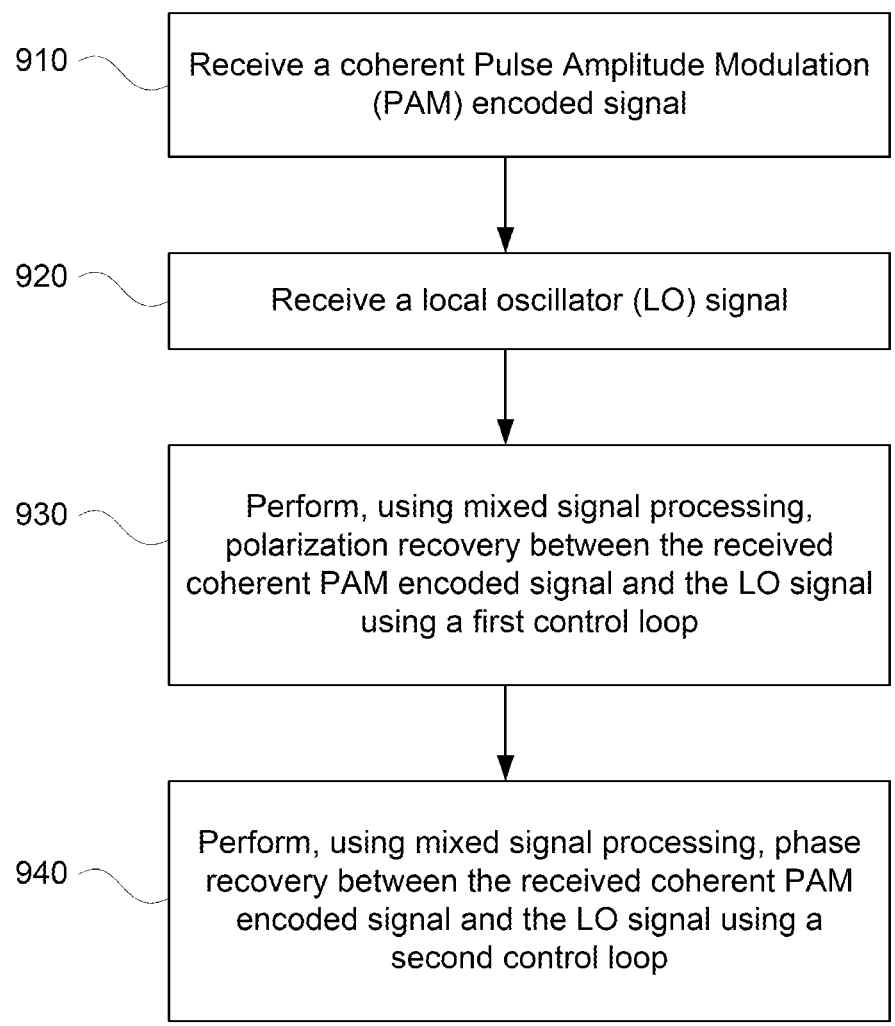
FIG. 9 is a flow diagram illustrating an example method in accordance with aspects of the disclosure.

FIG. 9 shows an example flow diagram 800 for receiving coherent PAM encoded signal. Flow diagram 900 may be performed by a receiver system, such as any of the receiver systems shown in FIGS. 1A-4, and 6. Processors in the receiver system, such as processors 820 of FIG. 8, may receive data and make various determinations as shown in the flow diagram 900.

Referring to FIG. 9, at block 910, a coherent Pulse Amplitude Modulation (PAM) encoded signal may be received. For example, the coherent PAM encoded signal may be a single polarization signal, such as shown in FIGS. 1A, 1B, 3A, and 3B. As another example, the coherent PAM encoded signal may be a dual-polarization signal, such as shown in FIGS. 2A, 2B, 4, and 6. As still another example, the coherent PAM encoded signal may include multiple wavelengths, such as shown in FIGS. 3A and 3B.

At block 920, a local oscillator (LO) signal is received. For instance, for single polarization PAM encoded signal with a single wavelength as shown in FIGS. 1A and 1B, the LO signal may be received and mixed with one PAM signal. In contrast, for dual-polarization PAM encoded signal such as shown in FIGS. 2A, 2B, 4, 6, or for PAM encoded signal with multiple wavelengths such as shown in FIGS. 3A and 3B, the LO signal received may be split into multiple beams before being combining with respective PAM encoded beams of different polarization and/or wavelengths.

At block 930, polarization recovery between the received coherent PAM encoded signal and the LO signal is performed using a first control loop using mixed signal processing. For instance as described in relation to FIGS. 1A and 3A, the polarization feedback control loop may be performed by analyzing beating signal between LO and a polarized portion of the received coherent PAM encoded signal with encoded data. Alternatively as described in relation to FIGS. 1B and 3B, the polarization feedback control loop may be performed by minimizing optical power of a polarized portion of the received coherent PAM encoded signal without encoded data. In another example described in relation to FIGS. 2A and 2B, polarization feedback control loop may be performed by minimizing pilot tone of a dither signal. As another alternative shown in FIGS. 4A and 4B, the polarization control loop may include a 1×2 polarization controller followed by a joint polarization-diverse and phase-diverse coherent detection circuitry. The 1×2 polarization controller may be configured to introduce a 45° polarization angle between the received signal after polarization adjustment and the LO, and the final polarization recovery may be achieved in the electrical domain. This is different from the polarization recovery methods described in FIGS. 1A-3B, where polarization controller/demultiplexer is introduced to align the received signal polarization to the LO such that polarization recovery can be achieved in the optical domain while electrical processing is only used to determine how to adjust the polarization controller/demultiplexer.

As still another example described in relation to FIG. 6, polarization recovery may be performed with mixed analog and digital signal processing via a feedback control loop between an analog equalizer 690 and a DSP 680.

At block 940, phase recovery between the received coherent PAM encoded signal and the LO signal using a second control loop using mixed signal processing. For example as described in relation to FIGS. 1A, 1B, 2A, 2B, 3A, 3B, the phase feedback control loop may be performed by analyzing pilot data symbols. As an alternative, a feedforward control loop may be used to perform phase recovery as shown in FIGS. 4A and 4B. Further as described in relation to FIG. 6, phase recovery may be performed with mixed analog and digital signal processing via a feedback control loop between an analog equalizer 690 and a DSP 680. Additionally, for instance as described in relation to FIGS. 1A, 1B, 2A, 2B, 2A, and 3B, a frequency feedback control loop may be performed by analyzing FFT between the LO signal and the coherent PAM encoded signal.

The technology provides power efficient receiver systems in datacenters. The technology provides receiver systems that are compatible with both coherent PAM and IM-DD PAM transmission systems, which increases design flexibility of a datacenter. Further, by using mixed optical and electrical processing, and/or mixed electrical and digital processing, components with high power consumption may be reduced. Additionally, by using a PAM system that does not perform phase modulation, requirements on optical equipment, such as lasers, may be relaxed, which may further increase power efficiency and design flexibility.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject

The invention claimed is:

1. An optical system, the optical system comprising:
   a transmitter system, the transmitter system comprising:
      a laser;
      a first two-mode optical switch;
      a coarse wavelength division multiplexer; and
   a receiver system, comprising:
      an optical polarization component configured to modulate a polarization of a received Pulse Amplitude Modulation (PAM) encoded signal;
      a coarse wavelength division demultiplexer in optical communication with the optical polarization component;
      an optical phase modulator configured to modulate a phase of a local oscillator (LO) signal;
      an optical coupler (OC) configured to combine the received coherent PAM encoded signal with the LO signal;
      a second two-mode optical switch; and
      a digital signal processor (DSP) configured to:
         perform polarization recovery between the received coherent PAM encoded signal and the LO signal using a first feedback loop with the optical polarization component;
         perform phase recovery between the received coherent PAM encoded signal and the LO signal using a second feedback loop with the LO.

2. The system of claim 1 wherein, when the first two-mode switch is set in a first mode, the two-mode switch is configured as an optical coupler (OC) for transmitting coherent PAM encoded signal.

3. The system of claim 2 further comprising a low-speed circuit configured to detect an average power of a polarized portion of a received coherent PAM encoded signal, wherein the DSP is configured to determine the polarization adjustments by minimizing the average power of the polarized portion.

4. The system of claim 2 wherein, when the two-mode switch is set in a second mode, the two-mode switch is configured as a switch for transmitting an intensity modulation direct-detect (IM-DD) PAM encoded signal.

5. The system of claim 2 further wherein the DSP is configured to determine phase adjustments to the LO in an electrical domain and the one or more optical phase modulators are configured to apply the phase adjustments to the LO signal in an optical domain.

6. The system of claim 2 further wherein the DSP is configured to determine the phase adjustments based on known pilot data symbols inserted in the received coherent PAM encoded signal.

7. The system of claim 2 wherein the DSP is configured to determine frequency adjustments to the LO signal in an electrical domain and the one or more optical phase modulators are configured to apply the frequency adjustments to the LO signal in an optical domain.

8. The system of claim 2 wherein the DSP is configured to determine frequency adjustments to the LO in an electrical domain and the LO is configured to apply the frequency adjustments to the LO signal in an optical domain.

9. The system of claim 1 wherein, when the second two-mode switch is set in a first mode, the two-mode switch is configured as an optical coupler (OC) for receiving coherent PAM encoded signal.

10. The system of claim 9 further comprising a low-speed circuit configured to detect an average power of a polarized portion of a received coherent PAM encoded signal, wherein the DSP is configured to determine the polarization adjustments by minimizing the average power of the polarized portion.

11. The system of claim 10 wherein, when the second two-mode switch is set in a first mode, the two-mode switch is configured as an optical coupler (OC) for receiving coherent PAM encoded.

12. The system of claim 9 further wherein the DSP is configured to determine phase adjustments to the LO in an electrical domain and the one or more optical phase modulators are configured to apply the phase adjustments to the LO signal in an optical domain.

13. The system of claim 9 further wherein the DSP is configured to determine the phase adjustments based on known pilot data symbols inserted in the received coherent PAM encoded signal.

14. The system of claim 1 wherein the first or second two-mode switch is a 2×2 Mach-Zehnder interferometer (MZI).

15. The system of claim 14 wherein an operation mode can be switched by adjusting the relative phase between a first path and a second path of the MZI.

* * * * *